United States Patent
Kobashi et al.

(10) Patent No.: US 7,757,167 B2
(45) Date of Patent: Jul. 13, 2010

(54) DOCUMENT LAYOUT PROCESSING USING TEMPLATES

(75) Inventors: Kazufumi Kobashi, Kanagawa-ken (JP); Kenta Hara, Kanagawa-ken (JP); Jun Makino, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 11/045,776

(22) Filed: Jan. 28, 2005

(65) Prior Publication Data

US 2005/0179947 A1 Aug. 18, 2005

(30) Foreign Application Priority Data

Jan. 30, 2004 (JP) .............................. 2004-024584

(51) Int. Cl.
*G06F 17/00* (2006.01)
(52) U.S. Cl. ...................................... 715/243
(58) Field of Classification Search ................. 715/517, 715/243

See application file for complete search history.

(56) References Cited

U.S. PATENT DOCUMENTS

| | | | |
|---|---|---|---|
| 5,060,170 A | 10/1991 | Bourgeois et al. | |
| 5,214,755 A | 5/1993 | Mason | 395/147 |
| 5,437,008 A | 7/1995 | Gay et al. | |
| 5,577,189 A | 11/1996 | Gay et al. | |
| 5,721,848 A * | 2/1998 | Joseph | 715/764 |
| 5,745,122 A | 4/1998 | Gay et al. | 345/433 |
| 5,845,303 A | 12/1998 | Templeman | 707/517 |
| 5,956,737 A * | 9/1999 | King et al. | 715/517 |
| 7,028,255 B1 * | 4/2006 | Ayers | 715/202 |
| 7,107,525 B2 * | 9/2006 | Purvis | 715/244 |
| 2002/0069215 A1 * | 6/2002 | Orbanes et al. | 707/500 |
| 2002/0140982 A1 * | 10/2002 | Nitta et al. | 358/1.18 |
| 2004/0070790 A1 | 4/2004 | Hara | 358/1.16 |

FOREIGN PATENT DOCUMENTS

| | | |
|---|---|---|
| JP | 62-284461 | 12/1987 |
| JP | 3071189 | 3/1991 |
| JP | 6096180 | 4/1994 |
| JP | 6203130 | 7/1994 |
| JP | 62303130 | 7/1994 |
| JP | 7-129658 | 5/1995 |
| JP | 8255255 | 10/1996 |
| WO | 01/39019 | 5/2001 |

OTHER PUBLICATIONS

Canfora, et al., "A Visual Approach to Define XML to FO Transformations", SEKE '02, copyright ACM 2002, p. 563-570.*
U.S. Appl. No. 10/986,007, filed Nov. 12, 2004.
U.S. Appl. No. 11/038,237, filed Jan. 21, 2005.
U.S. Appl. No. 11/041,742, filed Jan. 25, 2005.
U.S. Appl. No. 11/045,946, filed Jan. 28, 2005.
Lok, Simon et al., "A Survey of Automated Layout Techniques for Information Presentations", International Symposium on Smart Graphics, 2001, pp. 1-8.

* cited by examiner

*Primary Examiner*—Amelia Rutledge
(74) *Attorney, Agent, or Firm*—Fitzpatrick, Cella, Harper & Scinto

(57) ABSTRACT

A document processing apparatus according to the present invention capable of changing a layout of a document dynamically in accordance with data to be laid out in the document, comprises
 a storage unit to store a template which contains a plurality of combinations of region information representing a region to lay out data and priority order information representing a priority order associated with the region; and
 a layout unit which lays out the data corresponding to the region in an order represented by the priority order in accordance with the template and changes a size or position of the region in accordance with the data without invading a region associated with a higher priority order than the region,
 wherein the template stored in said storage unit contains the priority order information independently for each region information.

12 Claims, 21 Drawing Sheets

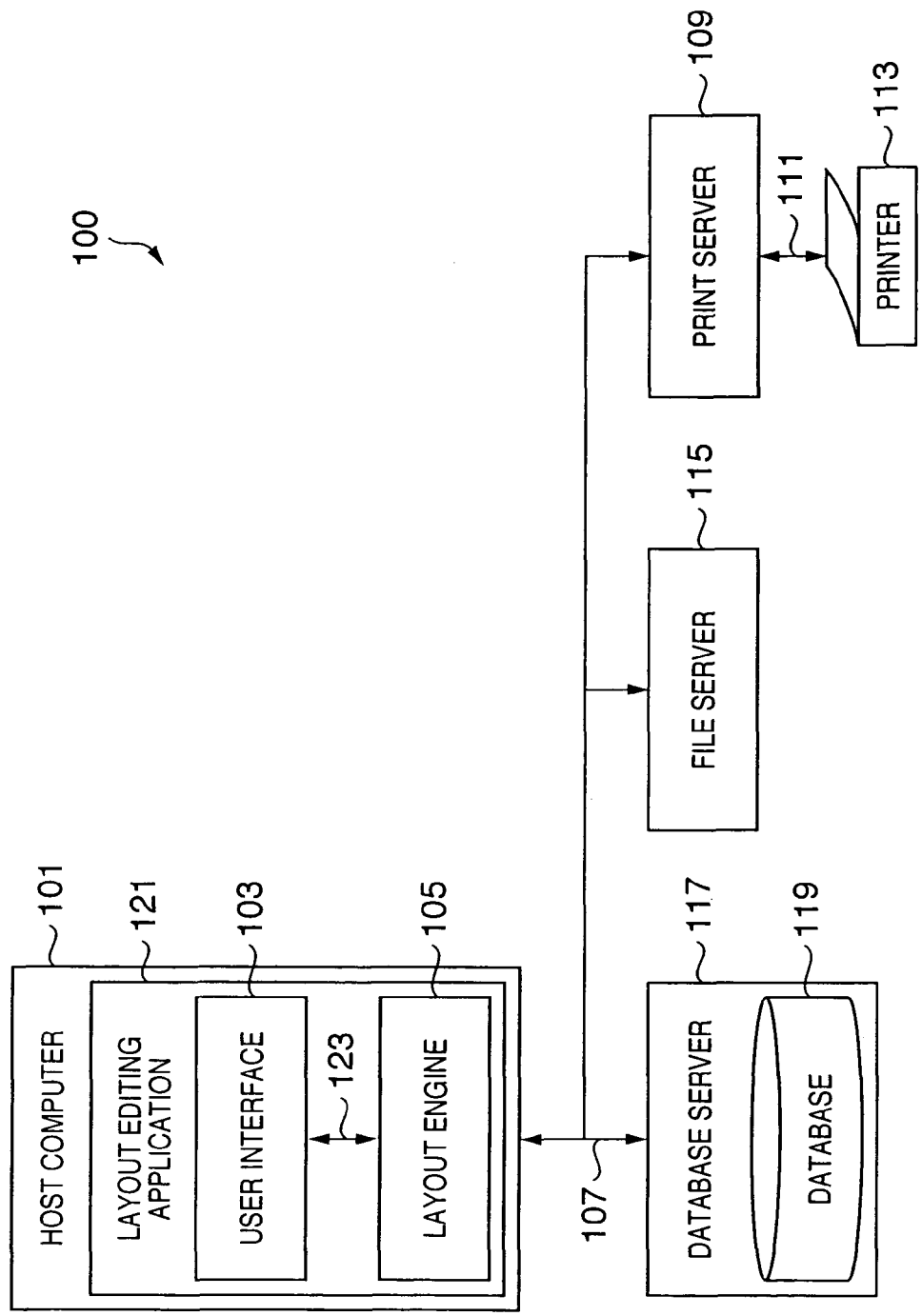

FIG. 6A
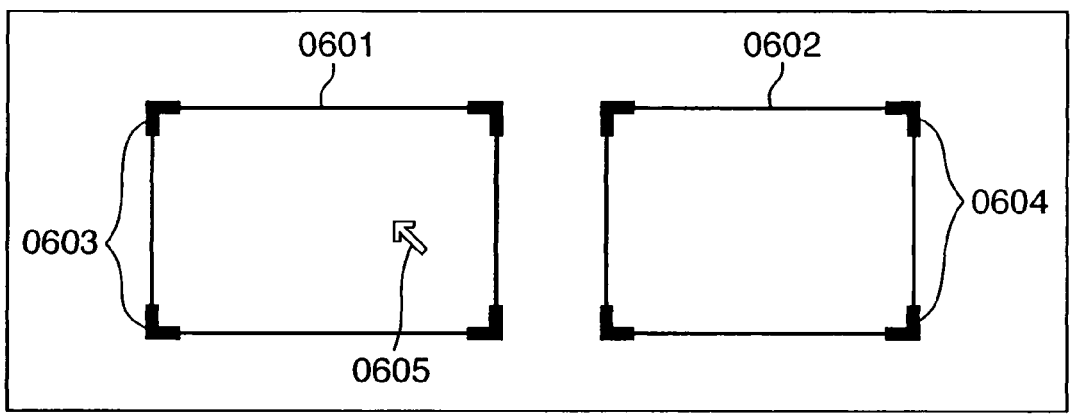
FIG. 6B
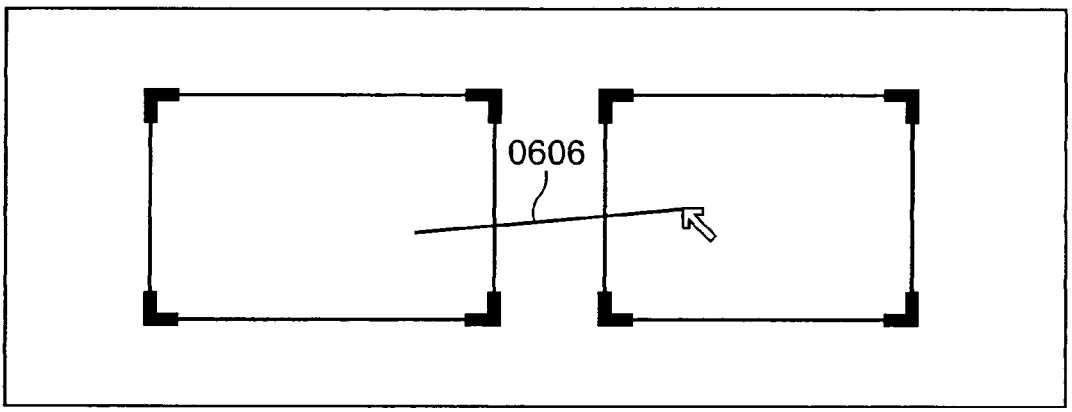
FIG. 6C
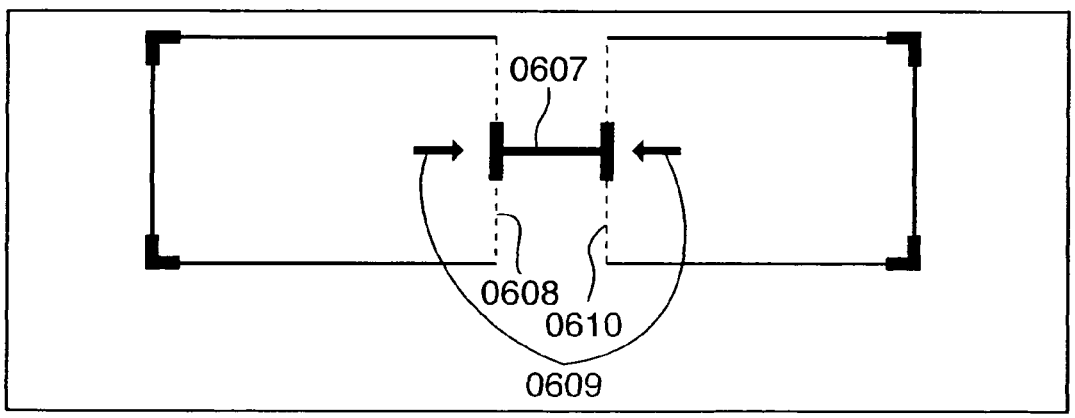

F I G. 13A
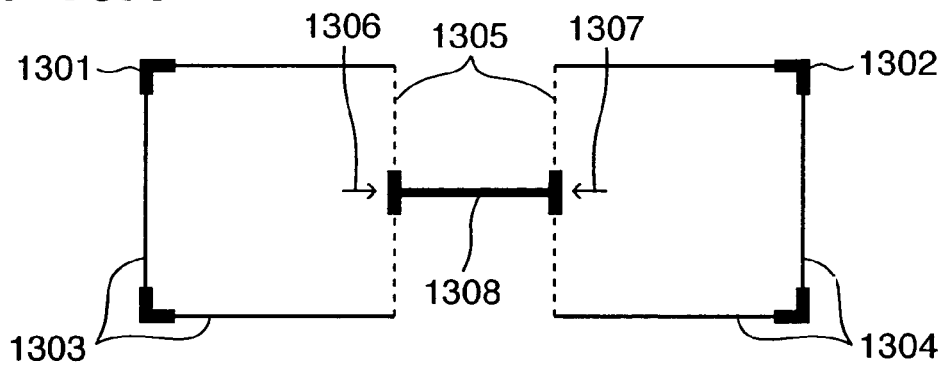
F I G. 13B
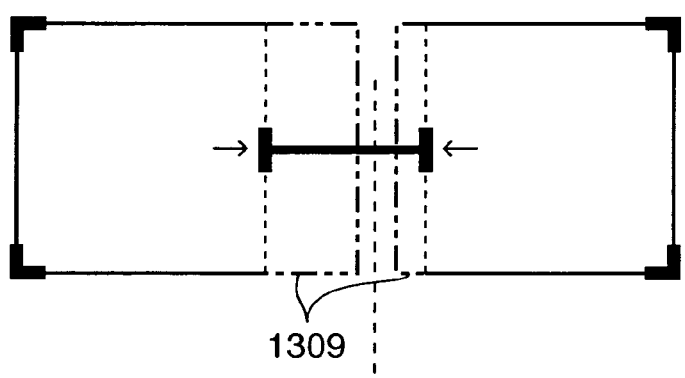
F I G. 13C
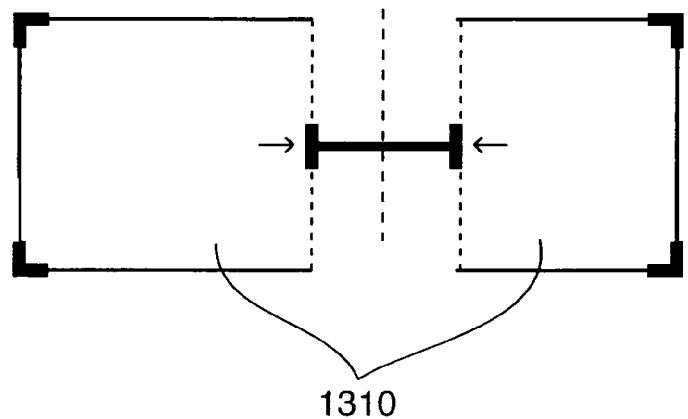

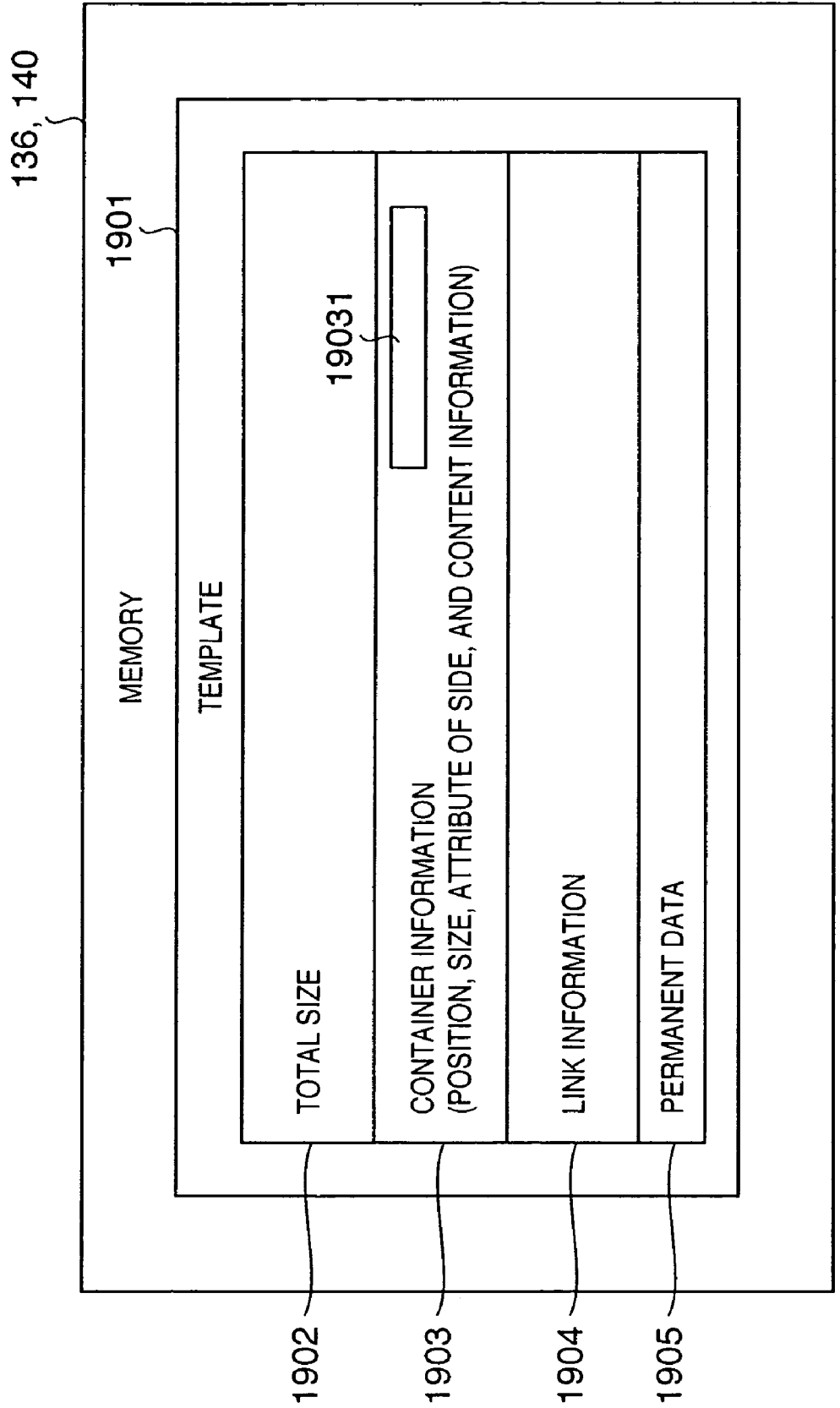

DOCUMENT LAYOUT PROCESSING USING TEMPLATES

FIELD OF THE INVENTION

The present invention relates to a document processing apparatus which has an automatic layout function of laying out the fields of records registered in, e.g., a database at predetermined positions to complete a document.

BACKGROUND OF THE INVENTION

Since the merchandise service life decreases recently due to a variety of merchandise items, and customization service orientation of consumers who use the Internet strengthens, the necessity of CRM (Customer Relationship Management) and one-to-one marketing has received a great deal of attention. These methods aim at increasing the customer satisfaction and winning and networking new customers.

The one-to-one marketing is a kind of database marketing. Personal attribute information such as the age, sex, hobby, taste, and purchase log of each customer is stored as a database. The contents of the information are analyzed, and a proposal that meets customer's needs is presented. A typical method is variable print. Along with the recent progress in DTP (DeskTop Publishing) technology and the spread of digital printers, variable print systems have been developed, which customize and output a document for each customer. Such a system is required to optimally lay out and display contents in information quantity that changes for each customer.

In a conventional variable print system, containers (also called field regions in a document form) are laid out on a document as regions where pieces of information are displayed. A database and the containers are associated with each other to achieve layout display.

However, each container serving as a partial display region in which a text or image is to be pasted has a fixed size. For this reason, when data in the database is inserted in the container, and the data size is larger than the container size, text overlap or image clipping occurs. If the data size is smaller than the container size, a space is formed in the container. In either case, optimum layout display corresponding to the information amount of a text or image to be displayed cannot be implemented.

To solve this problem, automatic layout systems which change the container size in accordance with the information amount have been proposed. An automatic layout system can flexibly set the container size of a text or image. Some automatic layout systems can set a variable container size and increase the container size in accordance with the amount of data to be inserted. In another technique, if text data larger than a fixed container size is inserted, the font size of the text is reduced to display the entire text in the container.

However, when the size of a container is increased, it overlaps another container on the document. When the font size is adjusted in text data with a large amount, the font size becomes too small. Another automatic layout technique to solve these problems is disclosed in the "layout design apparatus" of Japanese Patent Laid-Open No. 07-129658. This document is referred as the patent document 1, hereinafter. In this technique, when the size of a container is increased, the size of another container adjacent to it is reduced.

However, the layout design apparatus described in the patent document 1 manages the priority orders of layout materials. A layout is determined by laying out materials in accordance with the priority order. The apparatus only determines the layout order of unit materials. Since the material with lowest priority is always laid out in a narrow region, the layout desired by the user cannot be obtained. In the automatic layout system described in the patent document 1, the priority order is determined by the type of material. For this reason, when the layout is calculated automatically on the basis of the size of data in the database, the user cannot specifically set how to change the size of each container. For example, assume that two variable containers A and B are present, and data from a database are inserted in them. If both the data inserted in the containers A and B are too large to fit in the page, the mechanism described in patent reference 1 determines the layout on the basis of the priority order set by the type of material. If the priority order is set in order of image, graphic, and text data, the size and position of the container A which receives, e.g., image data are determined first. Then, the size and position of the container B which receives text data are determined.

Even when the user wants to display (print) a specific container created in the document to be created with priority over remaining containers independently of the type of the content to be inserted in the container, the automatic layout system of patent reference 1 determines the predetermined priority order on the basis of the type of content. Even when a content which should have a greater appeal than remaining contents independently of the content type is inserted in a container, the size of the container is determined in consideration of the types of remaining contents. That is, each container cannot preferentially be laid out independently.

It is also impossible to set equal priority orders and determine the layout by increasing the size of each container on the basis of the size of a content inserted in it and changing the sizes of a plurality of containers relative to each other.

SUMMARY OF THE INVENTION

The present invention has been made in consideration of the above-described prior art, and has as its object to provide a document processing apparatus which can increase the degree of freedom of data layout by giving a priority order to each region where data is laid out on a template.

It is another object of the present invention to provide a document processing apparatus which can increase the degree of freedom of data layout by dynamically laying out each region where data is laid out on a template depending on whether a priority order is set for each region or not.

A document processing apparatus according to the present invention to solve the above-described problems has the following arrangement.

A document processing apparatus capable of changing a layout of a document dynamically in accordance with data to be laid out in the document, comprising:

storage means for storing a template which contains a plurality of combinations of region information representing a region to lay out data and priority order information representing a priority order associated with the region; and layout means for laying out the data corresponding to the region in an order represented by the priority order in accordance with the template and changing a size or position of the region in accordance with the data without invading a region associated with a higher priority order than the region, wherein the template stored in the storage means contains the priority order information independently for each region information.

According to the present invention, the degree of freedom of data layout can be increased by giving a priority order to each region where data is laid out on a template.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a block diagram showing an arrangement of a computer system according to an embodiment;

FIGS. 6A to 6C are views showing examples of a UI in creating a link;

FIGS. 13A to 13C are views showing examples of a UI corresponding to the flow in FIG. 11 of the present invention;

FIG. 19 is a view showing an example of the structure of template data.

DETAILED DESCRIPTION OF THE PREFERRED EMBODIMENTS

Preferred embodiments of the present invention will be described. The outline of the present invention will be described first. This embodiment is directed to computer software which causes a computer to implement a so-called variable printing function. This function creates a document by laying out records in a database in accordance with containers (partial regions in which data is to be inserted: also referred to as field regions) defined on a document template (also simply referred to as a template). This embodiment is particularly directed to computer software which causes a computer to implement an automatic layout system having an automatic layout function (or a document processing apparatus having this function) capable of changing the size of a container in accordance with the size of its content. A computer in which this software is loaded as an executable program functions as a document processing apparatus. In this embodiment, especially, the container size of data is changed on the basis of the data size in laying out the data in accordance with the template. In accordance with the priority order given to each container on the template, data is preferentially inserted in a container having a high priority order, and the container size is changed in accordance with the data size. The size of a container having a low priority order is changed without any influence on the container with the high priority order such that a predetermined distance defined by a link between the containers is maintained.

The arrangement and a computer system and that of an application according to an embodiment to which the present invention can be applied will be described next.

<System Arrangement>

Figure 1B:
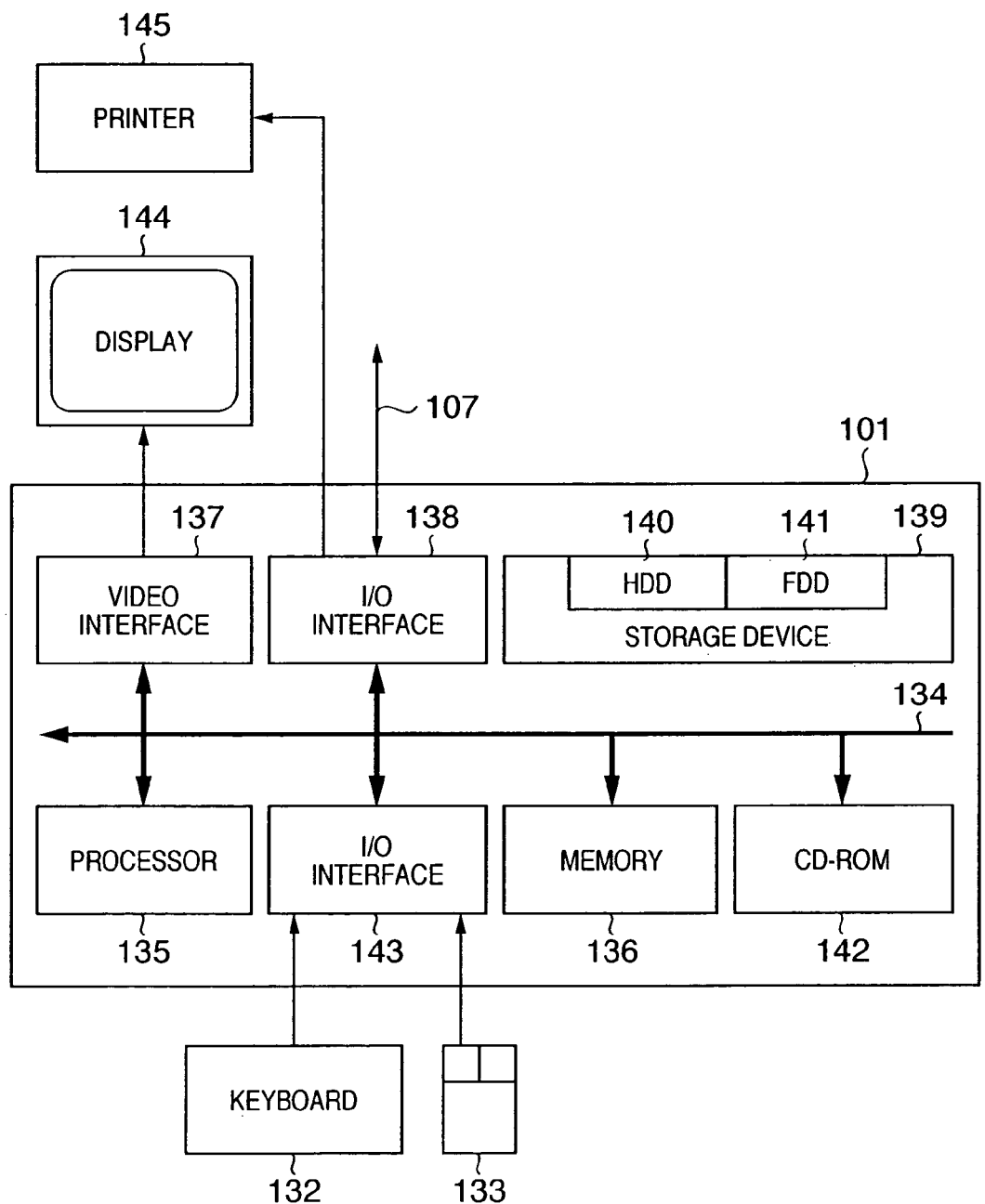
FIG. 1B is a schematic block diagram of a computer module according to the embodiment.

FIG. 1A shows a system 100 which prints a variable data document. A method to be described in this specification is practiced by causing a general-purpose computer module 101 (to be described in detail with reference to FIG. 1B) to execute a predetermined program. The process to be described with reference to FIG. 1A is executed in the entire or part of software like a layout editing application program 121 which is executed in the computer module 101 and becomes executable on the system 100. Especially, the step of layout editing or printing is executed in accordance with an instruction of software executed by the computer 101 serving as a document processing apparatus of the present invention. The software is stored in a computer-readable medium including, e.g., a storage device to be described below. The software is loaded from the computer-readable medium to the computer and executed by the computer 101. A computer-readable medium which has the software or a computer program recorded on a medium is a computer program product. When the computer program product is used in a computer, the computer functions as an apparatus capable of executing layout editing or variable data print of a document.

The computer module 101 is connected to an input device such as a keyboard 132 or a pointing device like a mouse 133 and an output device including a display device 144 and a local printer 145 depending on the situation. An input/output interface 138 connects the computer module 101 to another computer apparatus in the system 100 through a network connection 107. Typical examples of the network connection 107 are a local area network (LAN) and wide area network (WAN).

The computer module 101 generally includes at least one processor unit 135, a memory unit 136 including, e.g., a semiconductor random access memory (RAM) or read-only memory (ROM), an input/output (I/O) interface including a video interface 137, and an I/O interface 143 for the keyboard 132 and mouse 133.

A storage device 139 generally includes a hard disk drive 140 and flexible disk drive 141. Although not illustrated in FIG. 1B, a magnetic tape drive can also be used. A CD-ROM drive 142 is provided as a nonvolatile data source. The computer module 101 uses the constituent elements (135 to 143) included in the computer module 101, which communicate through an interconnection bus 134, by an operation system such as GNU/LINUX or Microsoft Windows (registered trademark) or by a method by the conventional operation mode of a computer system.

Examples of a computer having the arrangement shown in FIG. 1B are an IBM-compatible PC or Sparcstation available from SUN, or a computer system including them.

The layout application program 121 shown in FIG. 1A is normally resident in the hard disk drive 140 shown in FIG. 1B and loaded, executed, and controlled by the processor 135. In some cases, the application program 121 is encoded on a CD-ROM or flexible disk, loaded through the corresponding flexible disk drive 141 or CD-ROM drive 142, and provided to the user. Alternatively, the application program 121 may be loaded by the user from the network connection 107. The software can also be loaded in the computer module 101 from another computer-readable medium having an appropriate size, including a magnetic tape, ROM, integrated circuit, magnetooptical disk, wireless communication or infrared communication between the computer module 101 and another device, a computer-readable card such as a PCMCIA card, email communication, and the Internet or an intranet having recorded information on a WEB site. These are merely examples of related computer-readable media. Any other computer-readable medium can also be used.

The layout editing application 121 instructs to execute variable data printing (VDP) and includes two software components. The first component is a layout engine 105. This is a software component to calculate the positions of rectangles and lines which form containers on the basis of constraints and sizes given by rectangular containers. When the layout engine 105 operates as an application to determine the size and position of each partial region (container) and outputs drawing information to a printer driver (not shown), the printer driver executes image drawing processing of a variable data document and generates print data.

A user interface 103 as the second component provides a mechanism which causes a user to create a document template and associates the data source with a container in the document template. The user interface 103 and layout engine 105 communicate with each other through a communication channel 123. The data source for document generation is a general database 119 on a database server 117 formed by another computer which is generally making the database application run. The host computer 101 communicates with the database server 117 through the network connection 107. The layout editing application 121 generates a document template to be stored in the host computer 101 or a file server 115 formed by another computer. The layout editing application 121 also generates a document containing a document template merged with data. The document is stored in the local file system of the host computer 101 or in the file server 115, or directly printed by a printer 113. A print server 109 is a computer to provide a network function to a printer which is not connected directly to the network. The print server 109 and printer 113 are connected through a general communication channel 111.

Figure 2:
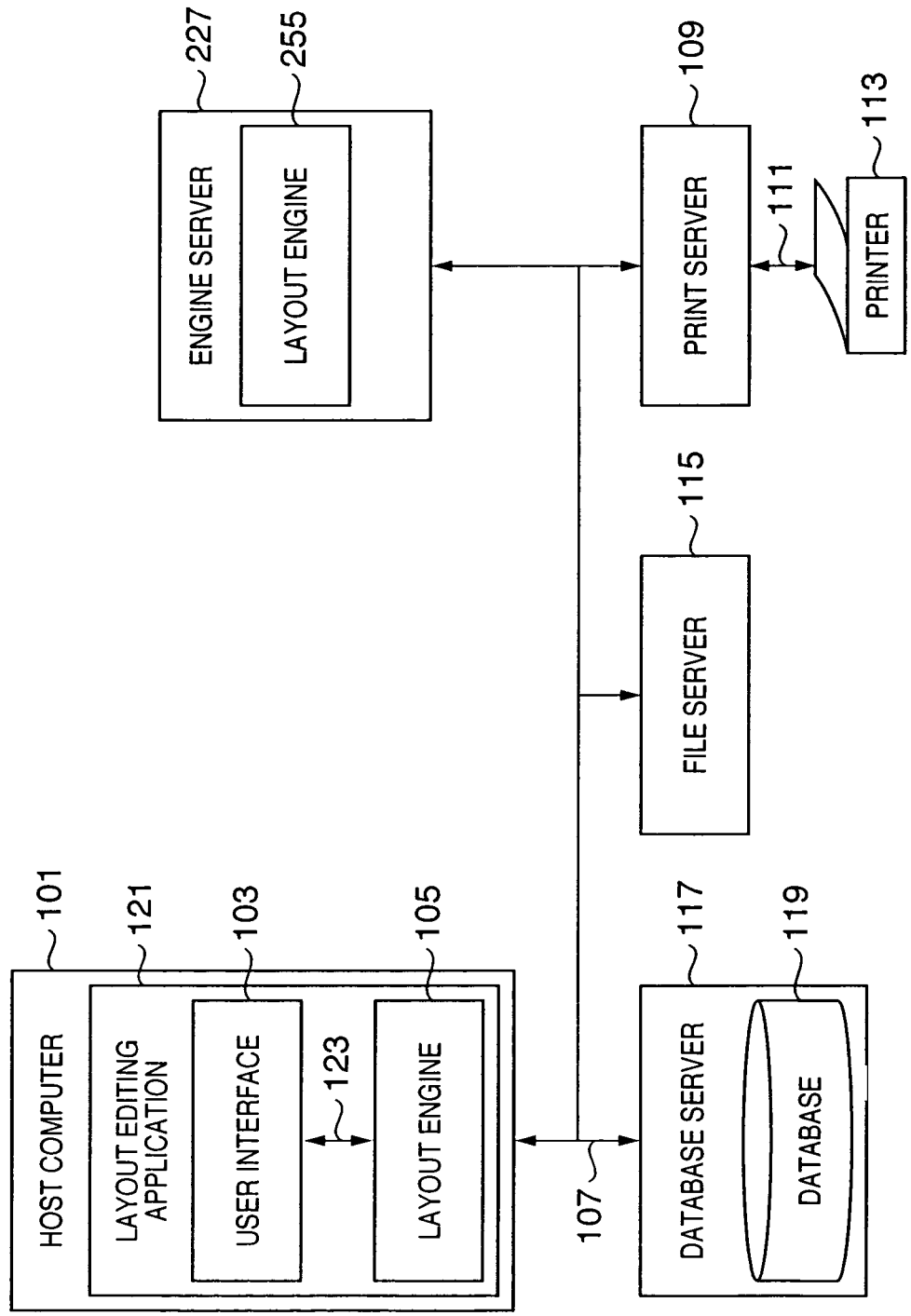
FIG. 2 is a block diagram showing another arrangement of the computer system according to the embodiment.

FIG. 2 shows an arrangement which separates a layout engine 255 from the arrangement shown in FIG. 1A and causes an engine server 227 to execute the layout engine. The engine server 227 is a general computer. A document template stored in the file server 115 can be merged with data stored in the database 119 to cause the layout engine 255 to generate a document for printing or another purpose. This operation is requested through the user interface 103 or requested to print only a specific record.

<Arrangement of Application>

(Main Window)

Figure 3:
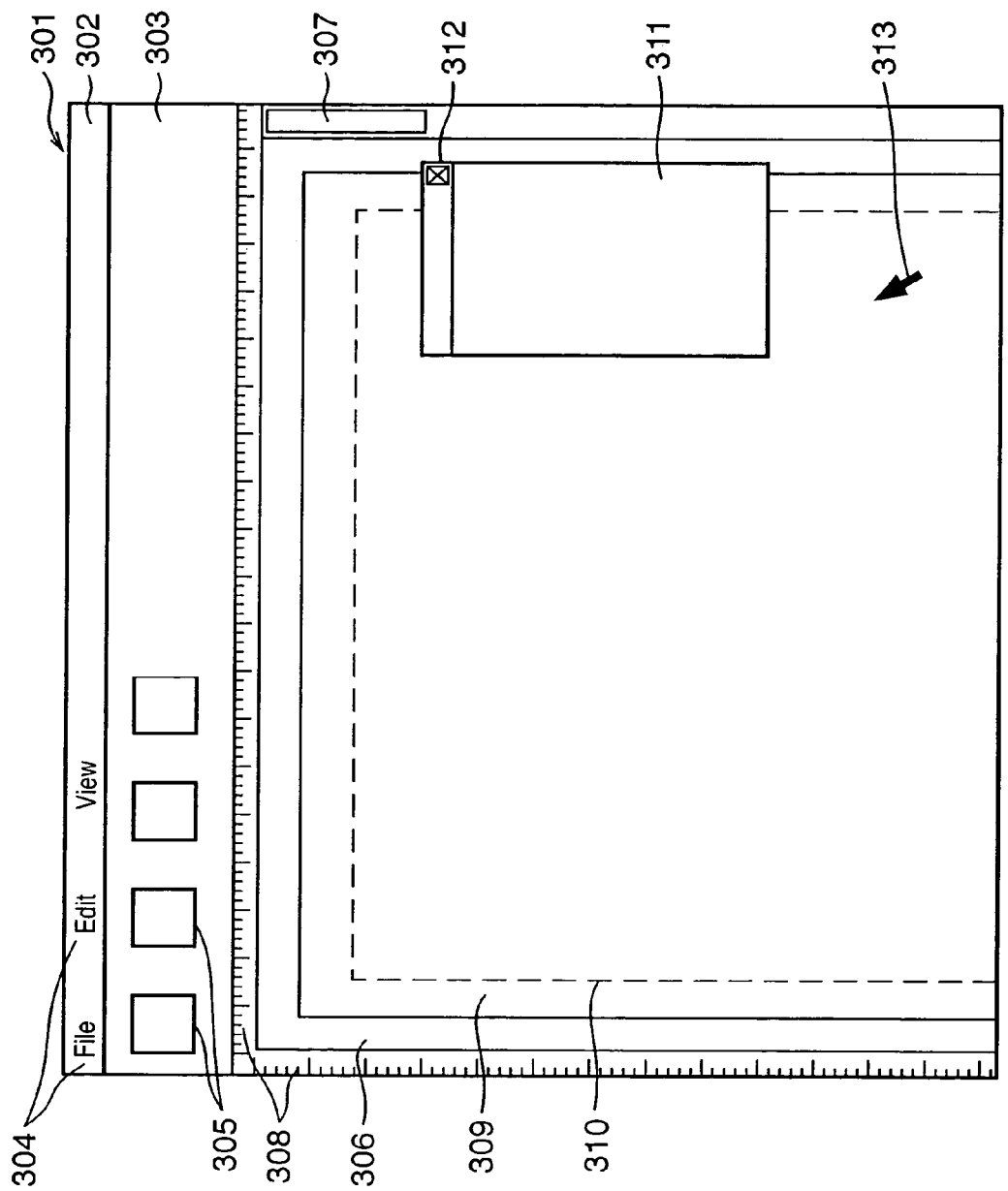
FIG. 3 is a view showing the main window of a typical application including a menu bar, tool bar, work area, and floating palette according to the embodiment.

As shown in FIG. 3, the user interface 103 includes a user interface formed by an application window 301 displayed on the video display 144 at the time of operation. The application window 301 is characterized by a menu bar 302 and tool bar 303 which can be set in a non-display state or moved to various positions on the screen, a work area 306 whose position can be moved by the position and operation of the mouse 133, an optional palette 311, and a cursor/pointer device 313.

The menu bar 302 as a known technique has a number of menu items 304 extended under the layer of menu options.

The tool bar 303 has a number of tool buttons and widgets 305 which can be set in a non-display state or display state by a special mode of the application.

An optional ruler 308 is used to indicate the position of a pointer, page, line, margin guide, layout frame (container), or object in the work area.

The palette 311 is used to access an additional function such as a variable data library. The palette 311 has a window control 312 to move, resize, or close it. The palette 311 can optionally be displayed on the foreground of the work area or hidden behind an object. The palette 311 can be displayed only within the application window 301 or can partially or wholly be displayed outside the application window 301.

Figure 4:
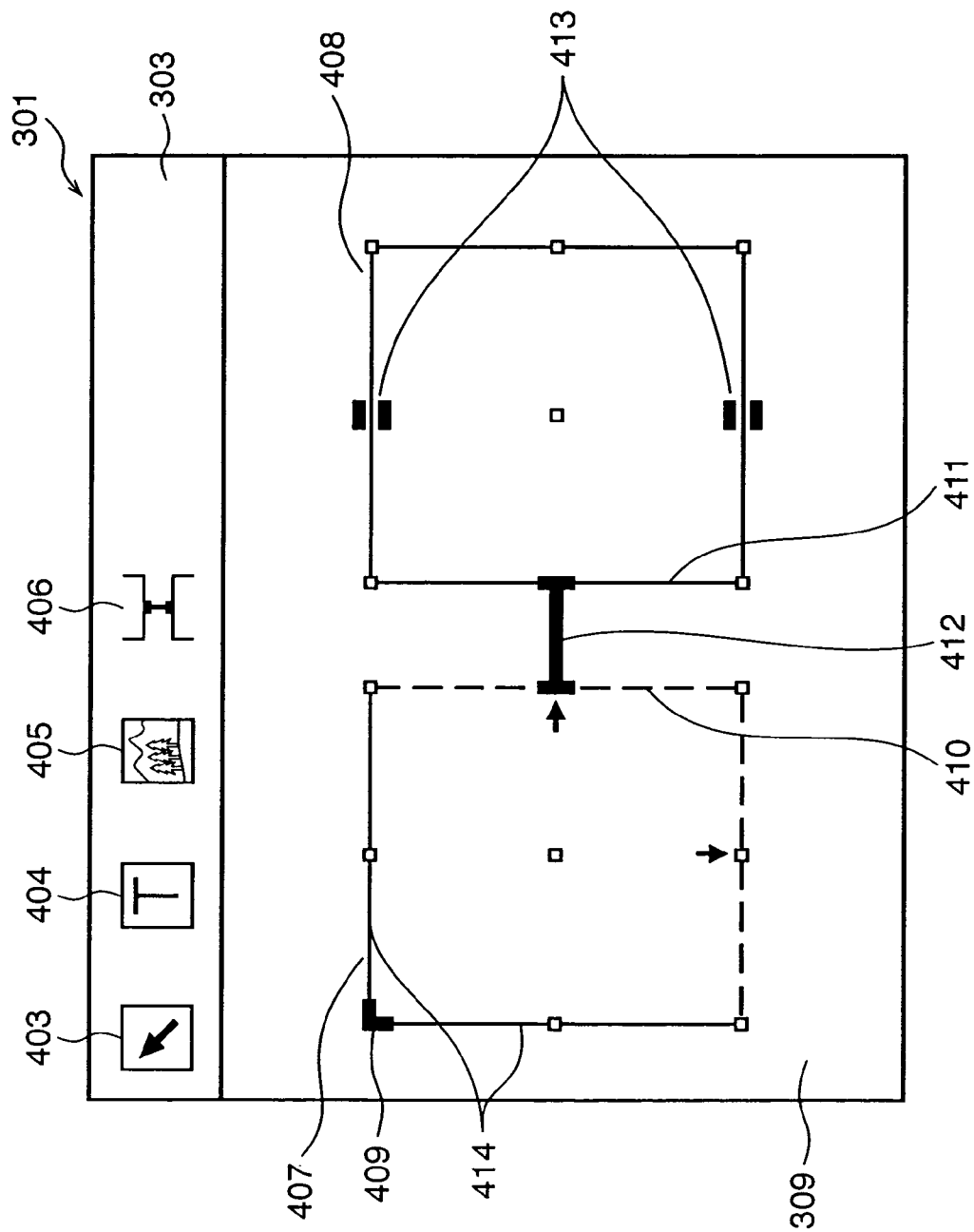
FIG. 4 is a view showing an aspect of typical containers which have a link between them, an anchor, and sliders according to the embodiment by using a screen, tools, and icons.

As show in FIG. 4, the tool bar 303 has at least following user-selectable "buttons".

(1) Select tool button 403: This button is used for side selection, movement, size change, resize, or lock/unlock of a container. A container is selected by dragging a select box around the container. When a plurality of containers are selected while keeping the CTRL key pressed, the plurality of containers can be selected.

(2) Image container tool button 404: This button is used to create a container having a static (fixed) or variable image.

(3) Text container tool button 405: This button is used to create a container having a static (fixed) or variable text.

(4) Link tool button 406: This button is used to create a link to associate containers with each other. This button is also used to control the distance of the link.

These buttons are mounted as tool chips of icons which change in accordance with the operation situation, as is well known.

In the application window 301 of the layout editing application 121 shown in FIG. 3, when containers and links are laid out in a page, a basic layout can be determined. The basic layout is a layout as a base of variable data print. When containers in the basic layout are fixed containers, all record print results have the same layout. When containers in the basic layout are variable containers (to be described later), the size or position of each container varies within the constraint range (to be described later) in accordance with the amount or size of data loaded for each record. The document template created by the layout editing application 121 is strictly used to determine the basic layout. When a variable container is included, the final layout of a printed product is adjusted in accordance with loaded data.

(Document Template)

The work area 306 is used to display and edit the design of the document template. It allows the user to design the outline of a printed document as preprocessing and understand how the merged document changes on the basis of the amount or size of variable data.

When an external data source (e.g., a record of a database) is linked to the template, a variable text or image is displayed in each container so that a preview of the current document can be obtained.

Objects serving as visual keys to express the document structure and variable data containers are always displayed when the cursor is moved onto a container, or a container is selected.

The work area 306 is characterized by a scroll bar 307, the optional ruler 308, and a document template 309. The document template 309 can indicate the presence of a plurality of pages.

The page size of a given document template is designated by the user by a known technique. For example, "Page Setup" is selected from "File" of the menu to display a dialogue to set the page size. The page size designated there by the user is reflected. The actual number of pages of each document can change depending on the variable data. When variable data cannot be fitted in one page, and the basic layout has no constraint to fit the containers in a page having a predetermined paper size, an additional page is automatically created. When a constraint (the constraint can be set by an anchor icon to be described later) to fit the containers in a page having a predetermined paper size is set in the basic layout, the size and position of each container are determined while changing their sizes relative to each other in the page, and variable data to be inserted is reduced as needed. Accordingly, the layout is determined dynamically for each record.

A border in each page is a page margin 310 representing the maximum width of an object printable on the page. The page margin 310 can be defined by the user.

FIG. 4 shows examples of objects which can be displayed on the document template 309 of one page. The objects include a plurality of containers 407 and 408, an arbitrarily applicable anchor icon 409, unfixed sides 410, a link, 412, and sliders 413. The anchor icon 409 can be set at a corner or side of the rectangle of a container or the center of a container. When the anchor icon 409 is set, the position of the set point is fixed. That is, in the example shown in FIG. 4, the anchor icon 409 is set at the upper left corner of the container 407. When variable data is inserted in the container 407, and the image size or text size of the variable data is large, the container can be enlarged to the right and lower sides. When the anchor icon 409 is set on a side, the side is fixed. The container can be enlarged in the directions of the three remaining sides. When the anchor icon 409 is set at the center of a container, the central position of the container is fixed. The container can be enlarged in four directions without changing the central position of the rectangle of the container. The link 412 (to be described later in detail) indicates that the containers 407 and 408 are associated with each other. The link 412 indicates that the container 408 can be moved to the right while maintaining the length (the range can be designated) set for the link. The sliders 413 indicate that the container can be moved in parallel to the sides on which the sliders are set.

(Container)

A container is a space (called a partial region) where a fixed or variable text or image is inserted from a variable data file to the document template for each record and drawn. A container is laid out together with other containers and objects. Movement, size adjustment, and re-creation of the container are done by using the pointer 313 by operating the mouse 133, as shown in the user interface window shown in FIG. 3 or 4.

Exactly speaking, a container has an aggregate of settings, visual expression, and interaction and editing operation. The definition of a container will be described below.

(1) A container is associated with a fixed or variable content. A variable content is dynamic in a sense that it is acquired from a data source (e.g., a record of a database) and can change depending on the document. Animated contents or contents which change over time by another method are not included in variable contents because they are not suitable for printing. A fixed content is displayed in the same manner in all documents generated by using one template. However, when a link is set between a fixed content and a variable content, the positions of containers containing fixed contents can change between documents as the positions and sizes of containers containing variable contents change.

(2) A container has ornament functions like text settings such as a background color, border, and font style applied to a content. This setting is called a container attribute. The container attribute can be set for each container. The setting can also be done such that a container has the same container attribute as another container.

(3) A container is merged with data when a document is generated. The ornament function is generally an output product and visible for all fixed contents. A variable content is obtained as specific data from the data source and displayed or printed. A content inserted in a container can be, e.g., printed, displayed on the screen 144, or subjected to both printing and display.

(4) A container has a user interface and, for example, an interactive GUI to edit the container or set display. Each element of the interface is normally displayed on the screen 144. The user interface 103 displays some of the ornament functions of a container such as the background color and font. The user interface 103 also has a function of editing or displaying container setting. Examples of purposes of the user interface function are a border, a corner icon to interactively change or display the size and position of the container, and the number of times of overwrite, line, icon, and text when the container is merged with data from the data source.

(Constraints of Container)

A container has constraints to control the manner a content to be displayed or printed in each document is fitted in the container. These constraints are used as a principal means for causing the user to control a number of documents by one document template. An example of the constraint is "the maximum height of the content of this container is 4 inches". Another example of the constraint is "the left edge of the content of the container must be displayed at the same horizontal position in each document". Various methods for displaying and editing the constraints by using a GUI will be described hereinafter.

A content place holder which designates the layout of a fixed content such that, e.g., an image has a defined position on a page is well-known in the digital print technique. In the following description, a container has a position and size which can be edited and displayed by a known technique.

The user can designate the sizes and positions of the contents of a document by designating the positions, sizes, and constraints of containers. Since a plurality of document are generated from one document template, the user interface needs to be used to designate and display a number of possible settings and constraints of containers.

The sides of one container define the virtual border of a content associated with the container displayed in the document. More specifically, the left side of a container corresponds to the left edge of layout of the content associated with the container in all documents to which the same template is applied. Similarly, the height of a container can be understood as a constraint of the height of a content associated with the container in a document generated by applying the same template. In this specification, this discrimination will be clarified in a description of the side or size of a container by referring to the user interface 103.

Detailed examples of container constraints in this embodiment will be described below. The term "fixed" is used in a sense that a certain value is commonly used in all documents in which a certain container is commonly used.

(1) When the width of a container is fixed, the width to be assigned to a content associated with the container has the same value (fixed value) for the page containing that container in all documents generated by using the template containing the container.

(2) When the height of a container is fixed, the height to be assigned to a content associated with the container has the same value (fixed value) for the page containing that container in all documents generated by using the template containing the container.

(3) When the distance constraint is fixed, the designated distance (fixed value) is a constraint for all documents generated by using the template containing the container.

(4) When the left and right sides of a container are fixed, the horizontal position of the sides of the container is the same for the page containing that container in all documents generated by using the template containing the container. However, the height or vertical position of the container can change. For example, if the left side of a container is fixed, the content associated with the container may be displayed near the upper edge of a page in a document generated by using a template or near the lower edge of a page in another document. However, the horizontal position of the left side is the same in all documents.

(5) When the upper and lower sides of a container are fixed, the vertical position of the sides is the same for the page containing that container in all documents generated by using the template containing the container. However, the width or horizontal position of the container can change.

(6) The vertical axis of a container is a virtual vertical line which is parallel to the right and left sides of the container and is located at the intermediate position therebetween. When the vertical axis of the container is fixed, the average of the horizontal positions of the left and right sides of the container is the same for the page containing that container in all documents generated by using the template containing the container. In this constraint, the width of the container can change. For example, the horizontal position of the left and right sides of a container can be close to or far from the vertical axis in different documents. However, the vertical axis is located at the same horizontal position for the page containing that container in all documents generated by using the template containing the container. The height and horizontal position of the container are not affected by this constraint.

(7) The horizontal axis of a container is a virtual horizontal line which is parallel to the upper and lower sides of the container and is located at the intermediate position therebetween. Like the vertical axis, when the horizontal axis of the container is fixed, it restricts the vertical position of the upper and lower sides of the container. However, the height is not affected by this constraint.

(8) When both the horizontal and vertical axes are fixed, the central position (intersection between the vertical and horizontal axes) of the container is fixed. However, the width and height of the container are not affected by this constraint.

(9) When a corner of a container, the intermediate position of a side of a container, or the central position of a container is fixed, the content associated with the container is displayed at the same position for the page containing that container in all documents generated by using the template containing the container. For example, when the upper left corner of a container is fixed, the upper left position of the container laid out is the same for the page containing that container in all documents generated by using the template containing the container.

(10) The vertical sides or vertical axis is fixed in association with the left or right side of the page, left or right page margin, or another horizontal position. Similarly, the horizontal sides or horizontal axis is fixed in association with the upper or lower side of the page, upper or lower page margin, or another vertical position.

A term opposite to "fixed" is "variable" which indicates that a side, axis, corner, intermediate position, or a document constraint can change between documents (between records). For example, in a page, the layout is expected to dynamically change depending on the size or amount of variable data. However, the user may want that the size or position of a specific container is fixed, or the four corners of a container at a corner of the page are fixed. For this purpose, the layout editing application 121 can appropriately set, for each container (partial region), whether to fix or change a side, axis, corner, or intermediate position. Hence, the user can create a desired basic layout in determining the basic layout of a document template 180.

<Layout Mode (Display and Editing of Container)>

The procedures for creating a document to be variable-printed can be divided into two phases, i.e., template creation processing (layout mode) for creating a template and a document creation processing (processing for displaying a preview of a document will particularly be called a preview mode) for creating a document by inserting contents in the created template. The layout mode will be described.

(Method of Creating New Container)

Containers are classified into two types: text container and image container. A text container has a text and an embedded image. An image container has only an image.

As shown in FIG. 4, a new text container or image container is created on the document template 309 by clicking o the text container tool 404 or image container tool 405 by the mouse 133 and dragging a rectangle onto the template 309.

Alternatively, a container can easily be created by activating the appropriate tool 404 or 405 and clicking the mouse on the document template 309. When a new container is created, a container having a default size is inserted. Alternatively, a dialogue box or prompt is displayed to input the size of the new container. A container can also automatically be created and laid out by a schema defined or calculated in advance. When the generated container is selected by an input means such as the mouse, and its properties are designated by clicking on the right button of the mouse, the container property dialogue is displayed so that constraints for the container can be set. In the container property dialogue UI (corresponding to a partial region setting means), various kinds of constraints described above can be set. In the container property dialogue, the size (width and height) and position of the container can be set. To set a variable size, the basic pattern (basic size and reference position) of the container is set. In addition, the maximum container size (width and height) and the minimum container size (width and height) can be set.

(Container Display Method)

The states of the sides of a container created in the document template are preferably graphically displayed on the user interface, as shown in FIG. 4. When the states of the sides are indicated by common expression, the number of types of objects corresponding to states can further be reduced.

FIGS. 5A to 5D are views showing display examples of a container. To express the state of a side, the layout editing application 121 expresses a side by a solid line 503 or dotted line 504. A container has anchors (line, shape, and icon indicated by objects 506, 507, and 509 drawn near the sides), handles (control points drawn on or near the sides or shapes for movement and correction) 502, sliders (short parallel lines drawn on both sides of a side, 403 in FIG. 4), enlarge/reduce (arrow) icons 505, and colors as characteristic features.

The rules of the container display method shown in FIGS. 5A to 5D are as follows.

(1) When each side is fixed, the side is drawn by a solid line.

(2) When the width is fixed, the left and right sides are drawn by the solid lines 503.

(3) When the height is fixed, the upper and lower sides are drawn by the solid lines 503.

(4) The axes are not drawn.

(5) The enlarge/reduce icons 505 are drawn near a side which is not drawn yet, and the side is drawn by a dotted line 504.

(6) At the intersection between a vertical side or axis and a horizontal side or axis, an anchor is drawn if both of the sides or axes crossing each other are fixed.

(7) When no anchor is drawn anywhere on a fixed side, a slider is drawn at the center of the side.

(8) At the intersection between a vertical side or axis and a horizontal side or axis, a handle is drawn if neither anchor nor slider is drawn there.

Flexible sides are drawn by dotted lines. Anchors are displayed at fixed points defined by the rules 6, 7, and 8. Sliders are displayed on fixed sides. Handles are displayed on remaining sides.

In the above-described rules, higher priority is given to a constraint set by the user later. That is, when another constraint is set later, and it can affect sides which should be drawn in accordance with the above-described rules, the drawing contents of solid line or dotted lines are changed.

The location where a variable side (i.e., a movable side) is drawn depends on the content of the container. As will be described later, "dynamic correction processing" is performed in which a content is merged with a document template, and a document is displayed on the user interface.

These content expressions provide a graphical means for displaying the state of a side of a container. The expressions can be interpreted in the following manner.

(1) A dotted line indicates the position of a side in the document corresponding to the content of the container, like the side 410 shown in FIG. 4.

(2) A solid line indicates a restricted side. This is because a side indicated by a solid line is fixed (side 414), or the width or height of the container is fixed (both the width and height are fixed in the container 408).

(3) An anchor indicates that the intersection between sides or axes is fixed. For this reason, an anchor point appears at the same horizontal and vertical positions in all documents to which a document template containing the anchor point is applied. The anchor is fixed, as a matter of course. The icon 409 in FIG. 4 is an example of an anchor icon which aims at fixing the sides 414 crossing each other.

(4) A slider indicates that the associated side is fixed in the vertical direction of the side. However, the container can be moved to a position slid along the side by the "length of the slide". For example, the content of the container 408 may be moved to the left or right in the document and displayed by operating the sliders 413.

Some or all of these icons and sides are drawn or not depending on which tool or container is selected, highlighted, or activated. Generally, the sides of a container and icons are displayed to design the document template and not drawn on a printed product to which the created document template is applied.

Settings of a basic pattern for the reference values, minimum values, and maximum values of the width and height of a container are displayed in a secondary dialogue window.

Figure 5A:
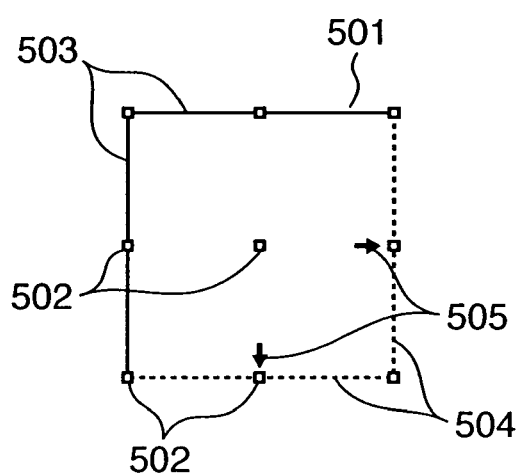
FIGS. 5A to 5D are views showing typical container rules according to the embodiment.

Referring to FIG. 5A, neither the width nor height of the container 501 is fixed. The fixed sides 503 are expressed by solid lines. The variable sides 504 are expressed by dotted lines. A dotted line indicates that the side can be changed in accordance with the size of a content of the container. On the other hand, the enlarge/reduce icons 505 are indicators representing that the adjacent sides 504 can be changed as another container associated by a link changes its size or moves.

Figure 5B:
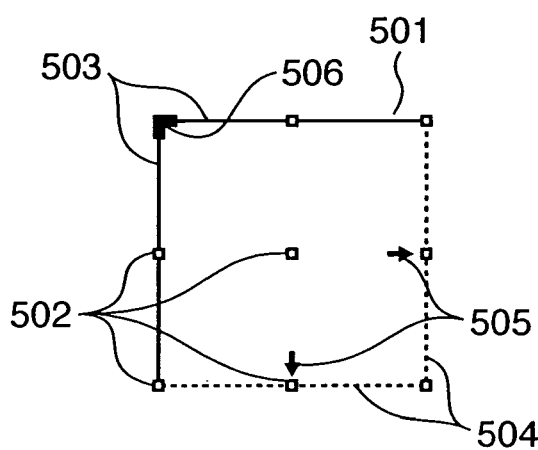

Referring to FIG. 5B, both the width and height of the container 501 are variable. The anchor icon 506 indicates that the two crossing sides 503 are fixed.

Figure 5C:
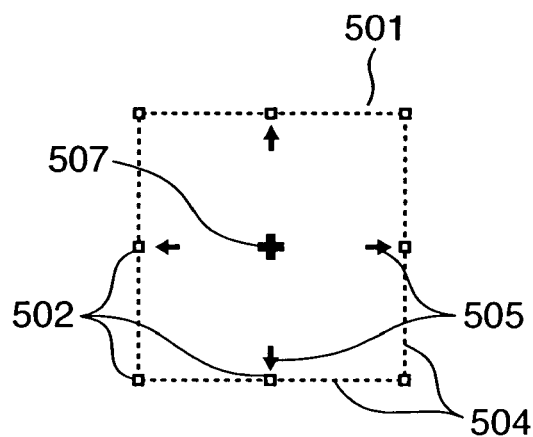

Referring to FIG. 5C, the container 501 can extend equally from the point indicated by the anchor icon 507. The container 501 can change both the width and height. In enlargement/reduction, the layout is adjusted such that the anchor icon 507 is always located at the central point of the container 501.

Figure 5D:
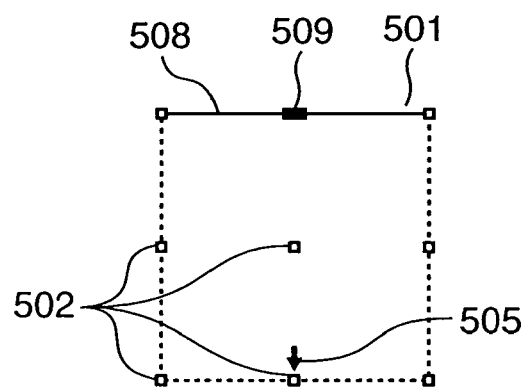

Referring to FIG. 5D, both the width and height of the container 501 are variable except that an upper side 508 is fixed. The anchor icon 509 displayed at the center of the upper side 508 indicates that the left and right sides of the container can move about the central axis (vertical axis) which passes through the icon 509 and is drawn vertically.

<Example of Data of Document Template>

FIG. 19 shows an example of data of a document template (to be referred to as template data). Referring to FIG. 19, template data 1901 is stored in the memory unit 136 or hard disk 140. The template data contains the following elements.

(1) Total size 1902: The page size of the whole template. The size is represented by, e.g., the vertical and lateral lengths, or a standard paper size.

(2) Container information 1903: Identification information to specify each container laid out on the template, the reference position of each container (position information), the length of a side (size information), the attribute of a side or point of a container (attribute information), and information of a content associated with a container.

Position information and size information are defined when a template is created. Position information indicates the reference position of a container set by the user when the container is created. When the position of the container is variable, the container size is changed in accordance with the size (image size or text size) of the content inserted in the container, and the container position is changed dynamically in accordance with the size of each container. When the position of the container is fixed by an anchor or the like, the position information indicates the fixed position. The position information contains information capable of specifying at least the positions of diagonal points of the container. All points may have position information on the template. Alternatively, one point may have position information on the template, and the remaining points may have relative position information. That is, the position can be defined by one point of the container and the size of the container. Fixed points may be defined by positions on the template, and variable points may be defined by relative positions.

Attribute information indicates the attribute of a side or axis of a container or the intersections between them, which have been described with reference to FIGS. 4 and 5A to 5D. The upper, lower, left, and right sides, horizontal and vertical axes, corner points, central point, width, and height of a container are defined by, e.g., the position and size. Whether each element is variable or fixed is defined by attribute information. When a document template is created by the user interface shown in FIG. 4, a side, point, or axis of a container is selected. In this state, the operator selects a desired item from menus "fixed" and "variable" displayed in the palette 311. Accordingly, the attribute "fixed" or "variable" is written in the container information 1903 in correspondence with the selected point or side. Default values immediately after container creation are, e.g., "variable". In this example, when a side or axis is "fixed", not the length of the side or axis or its position in the longitudinal direction but the position in a direction perpendicular to the longitudinal direction is fixed. When the attribute of a point or side is set, and accordingly, the attributes of the remaining points or sides are defined automatically, the attributes are also written. For example, when a corner point is designed as "fixed", the sides that define the point are also "fixed", and vice versa. In addition, for example, when the position of the central point is designated as "fixed", "fixed" is written in the attribute of the central point. Simultaneously, the attributes of horizontal and vertical axes are also written as "fixed". In this case, if the width and height remain variable, the attributes of the width and height are maintained "variable".

Information (content association information) about an associated content contains, e.g., information representing the container type (text container or image container), the identifier of a data source to be inserted in the container (e.g., some or all of the database name, record name, and field name), and association information (e.g., a conditional expression to extract the content). For a text container, text enhancement information such as information about the font, including the font type, size, color, italic, bold, and underline is also contained in the content association information.

Priority order information 19031 indicates a container whose size should preferentially be determined in all containers contained in the template. For example, if no priority is given to any container, equal priority order values are given to the containers. For example, a container having higher priority order (to be referred to as a priority container) preferentially changes its size. That is, the size of a priority container is calculated with priority over non-priority containers in accordance with the content size. On the other hand, the position and size of a non-priority container are calculated subordinately after the size of the priority container is determined. In this embodiment, the priority order information contains a non-priority flag which indicates that the width (or height) of each container associated by a link does not change in accordance with the content size. The size of a container for which no non-priority flag is set is determined with priority over a container for which the flag is set. In this embodiment, a priority flag holds separate flags in the height and widthwise directions.

Pieces of container information 1903 are held equal in number to containers arranged on the document template.

(3) Link information 1904: A link is association between containers and is especially information to set the distance between two containers combined by a link to a predetermined value (fixed link) or in a variable range (variable link). The link information contains, in each of the horizontal and vertical directions, the identifiers of two containers, information representing that a link is set between the opposing sides of the containers, and the distance between them in the direction along the link. Link information is held for each defined link. As the form of link information, the position of a side of each container may be held in each of the horizontal and vertical directions, and information representing that a link is set between the sides may be held.

(4) Permanent information 1905: Permanent information contains information to define a fixed portion except variable portions. For example, a text or image common to all documents (all records) generated by using the template can be defined. For a text or image, only position information can be defined instead of containing the data itself. Information to define the layout position on the template data is also contained, as a matter of course.

<Link Setting Method>

Figure 16:
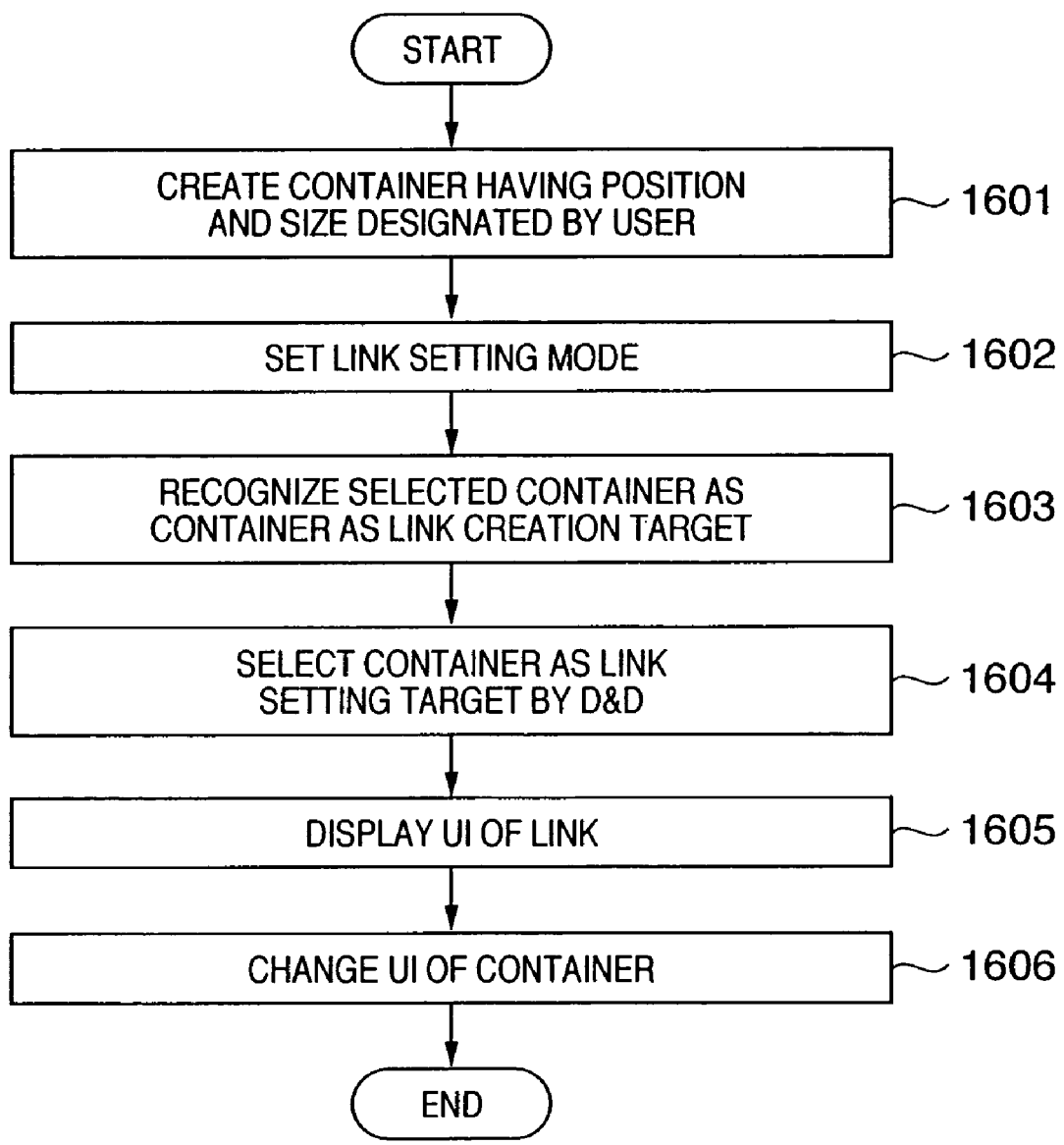
FIG. 16 is a flowchart showing a flow of link creation according to the present invention.

FIG. 16 is a flowchart showing a link setting method by the layout editing application 121. FIGS. 6A to 6C show examples of a UI. A method of setting a link between containers will be described below with reference to FIGS. 6A to 6C and 16.

First, to set a link, the layout editing application 121 creates containers (at least two containers) to set a link in accordance with an operation instruction from the user (step 1601). Next, the link tool button 406 shown in FIG. 4 is selected (step 1602). FIGS. 6A to 6C show examples of the user interface when two containers are created, the link tool is selected, and the operation of setting a link is executed. FIGS. 6A to 6C will be described sequentially.

Sides 0601 and 0602 shown in FIG. 6A are fixed sides which are the same as the sides 407 and 409 in FIG. 4 described above. Anchors 0603 and 0604 are the same as the anchor 409. First, the user selects one container as a link setting target by clicking on it (step 1603). As shown in FIG. 6B, the mouse pointer is moved to the other container, and the mouse is clicked on it (step 1604). A line 0606 shown in FIG. 6B indicates a line which connects the first click point in FIG. 6A and the position of the mouse pointer after movement. The line 0606 is a UI which presents the link setting position to the user. After step 1604, the containers are set in the state shown in FIG. 6C. A link 0607 is displayed at the set position (step 1605). When the link is set, the objects which indicate the containers are also changed automatically (step 1606). Sides 0608 and 0610 indicated by dotted lines are variable sides. The sides of the containers are changed as shown in FIG. 6C because they need to be changed to variable sides in accordance with link setting. If all sides are fixed even after link setting, a contradiction occurs. The above-described processing is executed automatically to prevent this contradiction. Enlarge/reduce icons (arrows) 0609 are the same as the icons 505 in FIGS. 5A to 5D. The enlarge/reduce icons 0609 are objects which visually present, to the user, directions in which the containers can change due to link setting. In the example shown in FIG. 6C, the right side 0608 of the left container and the left side 0610 of the right container change to variable sides. This is merely an example. The right container may have the slider 413 in FIG. 4.

This processing can be described as follows from the viewpoint of data processing in FIG. 19. For example, in step 1601, container information 1903 is defined by creating containers. In step 1606, the layout editing application 121 stores, as link information, that a link is set between the two containers selected in steps 1603 and 1604. In step 1606, the layout editing application 121 changes the attributes of the opposing sides of the two containers having the link as needed. For example, if at least one of the opposing sides is variable, the attributes of the sides need not be changed. However, if both sides are fixed, link setting is meaningless. Hence, at least one of the sides is changed to a variable side. In the example shown in FIG. 16, both sides are changed to variable sides. When the attributes of the sides are changed, the attribute information of each side having the changed attribute contained in the container information 1903 is rewritten.

In the above description, expression "opposing" has been used. This applies to a case in which two lines apparently oppose each other. Additionally, when lines themselves do not oppose (i.e., when the projections of two lines in the longitudinal direction do not overlap) but the extended lines of the lines oppose each other, a link can be set between the extended lines. In this specification, the expression "opposing" is used for containers associated by a link, including those having sides whose extended lines oppose each other. That is, a link can be set even between small containers laid out along, e.g., a diagonal line of the template.

As described above, when one of the opposing sides of containers associated by a link is variable, and the other is fixed, the variable side can move in accordance with the content size. The container itself on the side of the fixed side translates in accordance with the movement amount of the variable side (if no anchor is present). The distance (distance in the direction along the link) between the containers, which is defined by the link, is maintained. When both sides are variable, the sizes of both containers can change in accordance with content sizes. Even in this case, the distance between the containers is maintained.

<Priority Order Setting Method>

Figure 7:
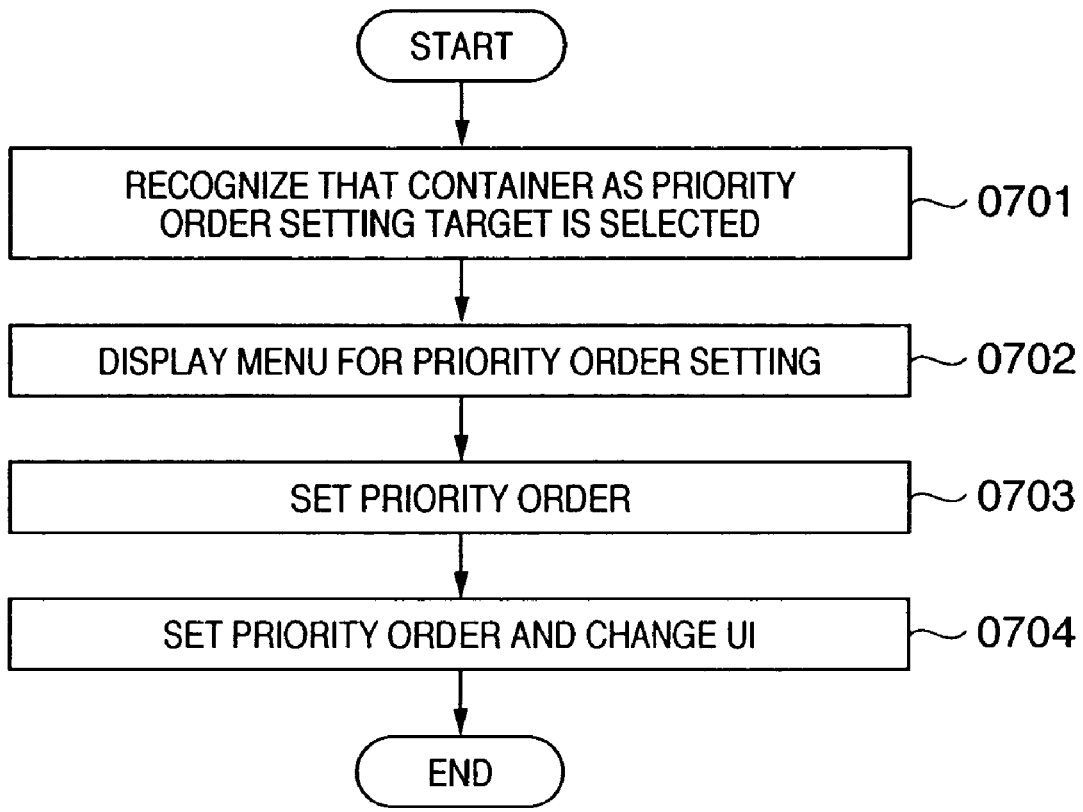
FIG. 7 is a flowchart of priority order setting according to the present invention.

FIG. 7 shows a priority order setting method by the operator. The procedures shown in FIG. 7 are executed by the computer shown in FIGS. 1A to 2 in accordance with the operation by the operator. The procedures are started from a state in which a template defined in advance is displayed. A template is created by defining, for each template, the attribute information of the template including a template name, containers defined in it, and container attribute, and the information shown in FIG. 19 such as link information and permanent information.

First, the layout editing application 121 selects a container for which a priority order is to be set in the preview widow in accordance with the operation of the user (0701). To select a container, the mouse cursor is moved to the position of the container as a set target, and the right or left button of the mouse is clicked on it. The user interface module 103 of the layout editing application 121 displays a menu for priority order setting (0702). As the menu, a pop-up menu displayed by clicking on the left button of the mouse can be used. Alternatively, a priority order setting dialogue may be prepared in the container properties. The priority order is set in accordance with the operation of the user (0703). The menu and setting will be described later in detail. Finally, the UI of the container is changed in accordance with the set priority order and displayed again in the preview display window of the template (0704). At this time, the container priority order information 19031 contained in the template is checked. If a priority flag is set, an enlarge/reduce icon corresponding to the set priority flag is erased, and the container is displayed again. The UI to be changed will be described later in detail.

Figure 8:
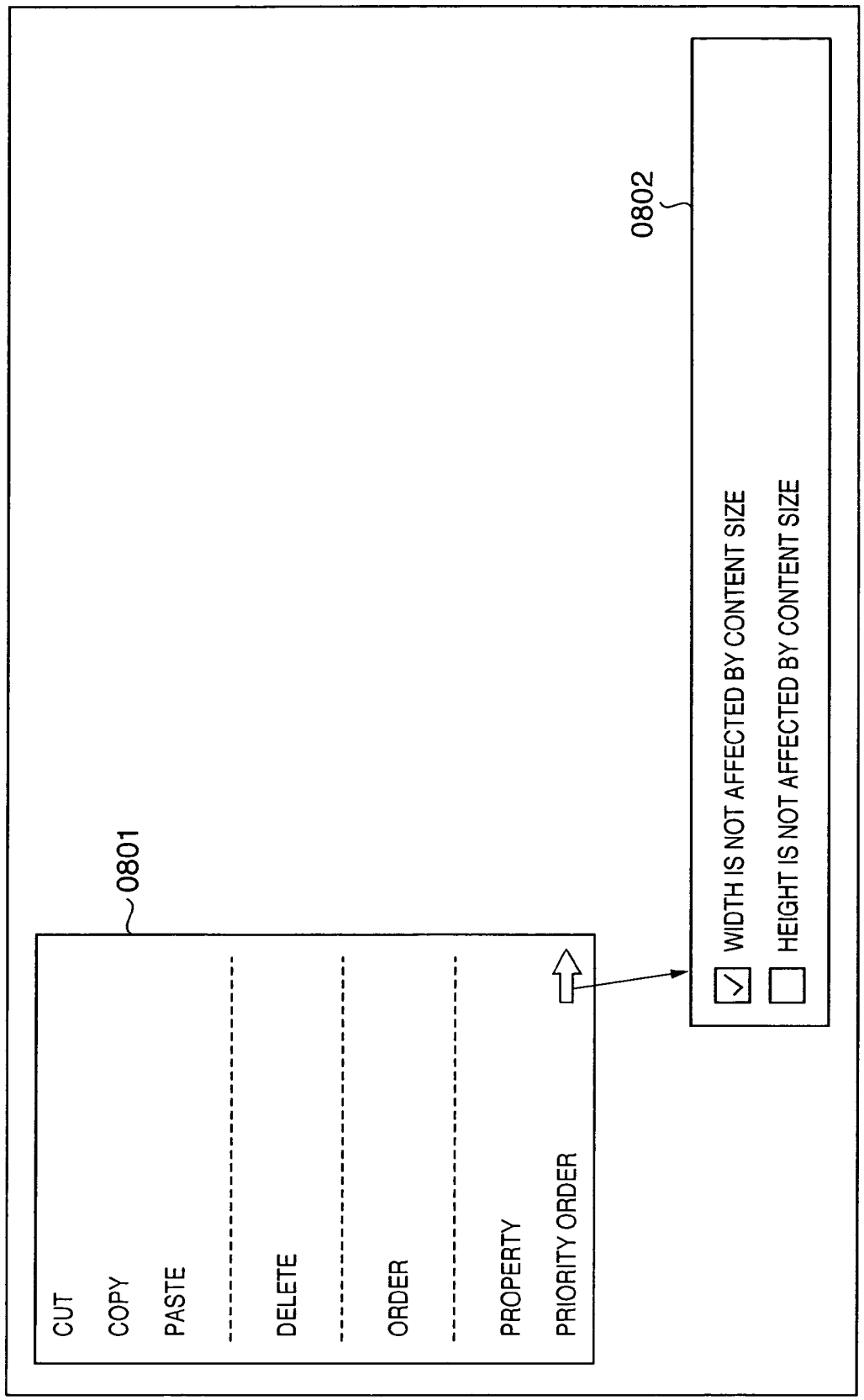
FIG. 8 is a view showing an example of a pop-up menu for priority order setting according to the present invention.

FIG. 8 shows the UI of a pop-up menu used to set a priority order for a container. A menu 0801 is a pop-up menu which is displayed on the window when the mouse pointer is moved onto a container, and the right button is clicked on it. When "priority order" is selected by the mouse pointer, a hierarchical menu 0802 is displayed. Referring to FIG. 8, a check box "width is not affected by content size" or "height is not affected by content size" can be selected. In this case, the priority order is not designated as a numerical value. Instead, it can be regarded as a priority flag which indicates whether to change the container size dynamically due to the influence of the size of the content to be inserted in the container associated with the priority order. Assume that a link is set between two containers. The priority flag "width (or height) is not affected by content size" is set for one container. The container having the set priority flag is affected by a change in size of the other container but does not change its size by the content of the container itself. Hence, when the priority order is set, the priority order becomes lower than that of the other associated container.

The procedures shown in FIG. 7 will be described from the aspect of data manipulation. When a container is selected in step 0701, the identifier of the selected container is stored in a memory area indicating a container of interest. In step 0701, the menu window shown in FIG. 8 is displayed. At this time, a check mark is displayed in a check box of the menu 0802 in accordance with the value of the priority flag for the height and widthwise directions, which is read out from the priority order information 19031 of the container information 1903 shown in FIG. 19. More specifically, when the priority flag is set, a check mark is displayed in a check box. (In this sense, the priority flag of this embodiment is a "non"-priority flag in fact. However, it is only the name that matters because if the meaning of the flag is reversed, a priority flag in a literal sense can be set). In step 0703, the layout editing application 121 reflects the new set value of the priority order input (checked) by the operator on the priority order information 19031 of the container information 1903. More specifically, the priority flag corresponding to the check box with the check mark is set, and the priority flag corresponding to the check box having no check mark is reset. Finally, in step 0704, the display of the user interface in FIG. 8 is updated in accordance with the reflected priority order information. More specifically, the side whose size should preferentially be changed is explicitly displayed in accordance with the value of the priority flag on the preview display of the template. This will be described below in detail with reference to FIGS. 9A to 9D.

Figure 9A:
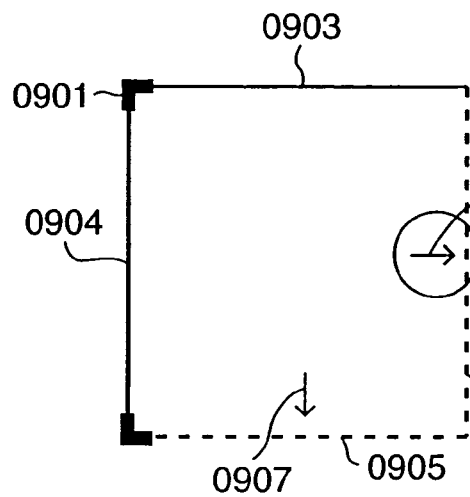
FIGS. 9A to 9D are views showing examples of a container UI which changes in priority order setting according to the present invention.
Figure 9B:
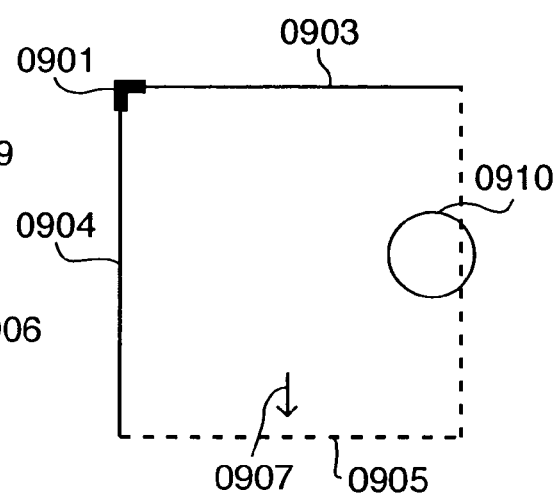

FIGS. 9A to 9D show display examples of the UI to explicitly visualize for the user the above-described priority order. FIG. 9A shows the state of a container which has no priority order set either in the height direction or in the widthwise direction. FIG. 9B shows the state of a container which has a priority order set in the widthwise direction. Referring to FIGS. 9A and 9B, the upper left corner of the container is fixed by an anchor 0901. For this reason, sides 0903 and 0904 are fixed. Sides 0905 and 0906 are variable. The container shown in FIG. 9A has no priority order set either in the height direction or in the widthwise direction and changes its size in accordance with the content size. Hence, a variable symbol 0907 (down arrow) in the height direction and an enlarge/reduce icon (right arrow) 0909 serving as a variable symbol in the widthwise direction are displayed. These are the same symbols as the arrows 0609 in FIG. 6C, which indicate the directions in which the container can change.

In the display shown in FIG. 9A, the pop-up menu 0802 shown in FIG. 8 is displayed. Assume that the user sets a check mark in the check box "width is not affected by content size" in the menu 0802 in FIG. 8. Then, the priority flag representing "width is not affected by content size" is set in step 0703 in FIG. 7 and stored in the priority order information 19031 in FIG. 19. In step 0704 in FIG. 7, the container state shown in FIG. 9B is displayed. No enlarge/reduce icon (arrow) 0909 is displayed in FIG. 9B (0910). When the priority order (priority flag) in the widthwise direction of the container is set, the setting is changed such that the container size is not affected in the widthwise direction by the size of the content to be inserted in the container. As a result, the arrow 0909 indicating the moving direction of the variable side to visually present the setting to the user is erased. That is, the side expressed by the dotted line indicates that its size can change due to a change in size of the container associated by the link. In addition, that the container size does not change due to the content size is indicated by erasing the enlarge/reduce icon.

Figure 9C:
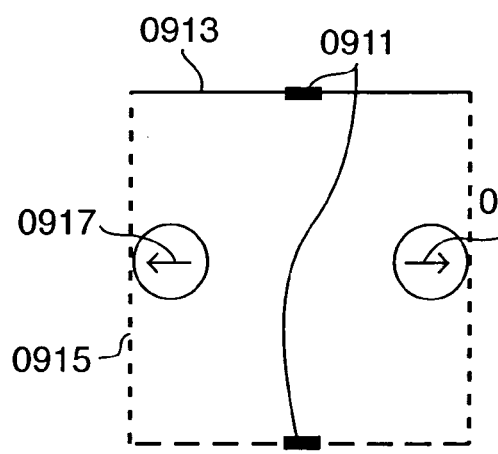
Figure 9D:
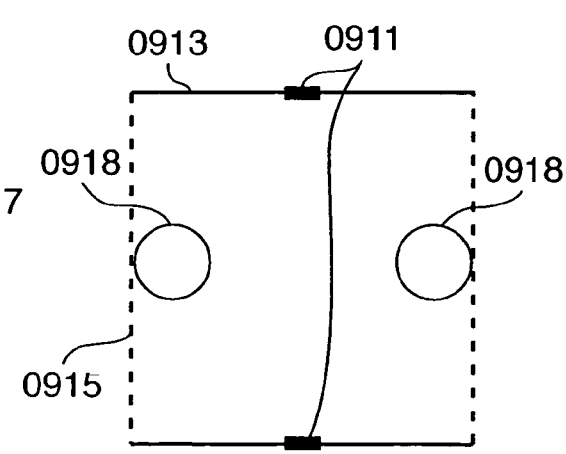

FIG. 9C shows an example of change of the UI in another case. Anchors 0911 are set on the upper and lower sides to indicate they are fixed in the vertical direction. In this case, a center lock state is set in which the central axis in the widthwise direction of the container is fixed. A side 0913 is a fixed side. A side 0915 s a variable side. Enlarge/reduce icons 0917 indicate the change directions of the variable sides. More specifically, the left and right sides change their positions on the basis of the content size. They also change the positions in accordance with the sizes of the linked containers. In the state shown in FIG. 9C, the pop-up menu shown in FIG. 8 is displayed, and the priority order is set. Assume that the user sets a check mark in the check box "widthwise is not affected by content size" in the menu 0802 in FIG. 8. The layout editing application 121 sets the priority flag representing "width is not affected by content size" in step 0703 in FIG. 7 and stores the priority flag in the priority order information 19031 in FIG. 19. The container state shown in FIG. 9D is displayed. No enlarge/reduce icons 0917 are displayed in FIG. 9D. The reason why the icons are erased is the same as in FIG. 9B. The difference between FIG. 9B and FIG. 9C is that since the left and right sides of the container are variable, the arrows representing that the container size can be changed are displayed on both sides in FIG. 9C. When the priority order is set, the arrows on the both sides are erased. This is because the setting is done such that the container size is not affected in the widthwise direction by the size of the content to be inserted.

As described above, in the container preview mode, when setting is done for a container such that the container size (i.e., the position of a side) is affected by the content size in at least one of the widthwise and height directions, a symbol (enlarge/reduce icon) is displayed in the template preview mode to indicate that the container size can be changed in the widthwise or height direction in accordance with the content size.

<Preview Display Processing>

Figure 10:
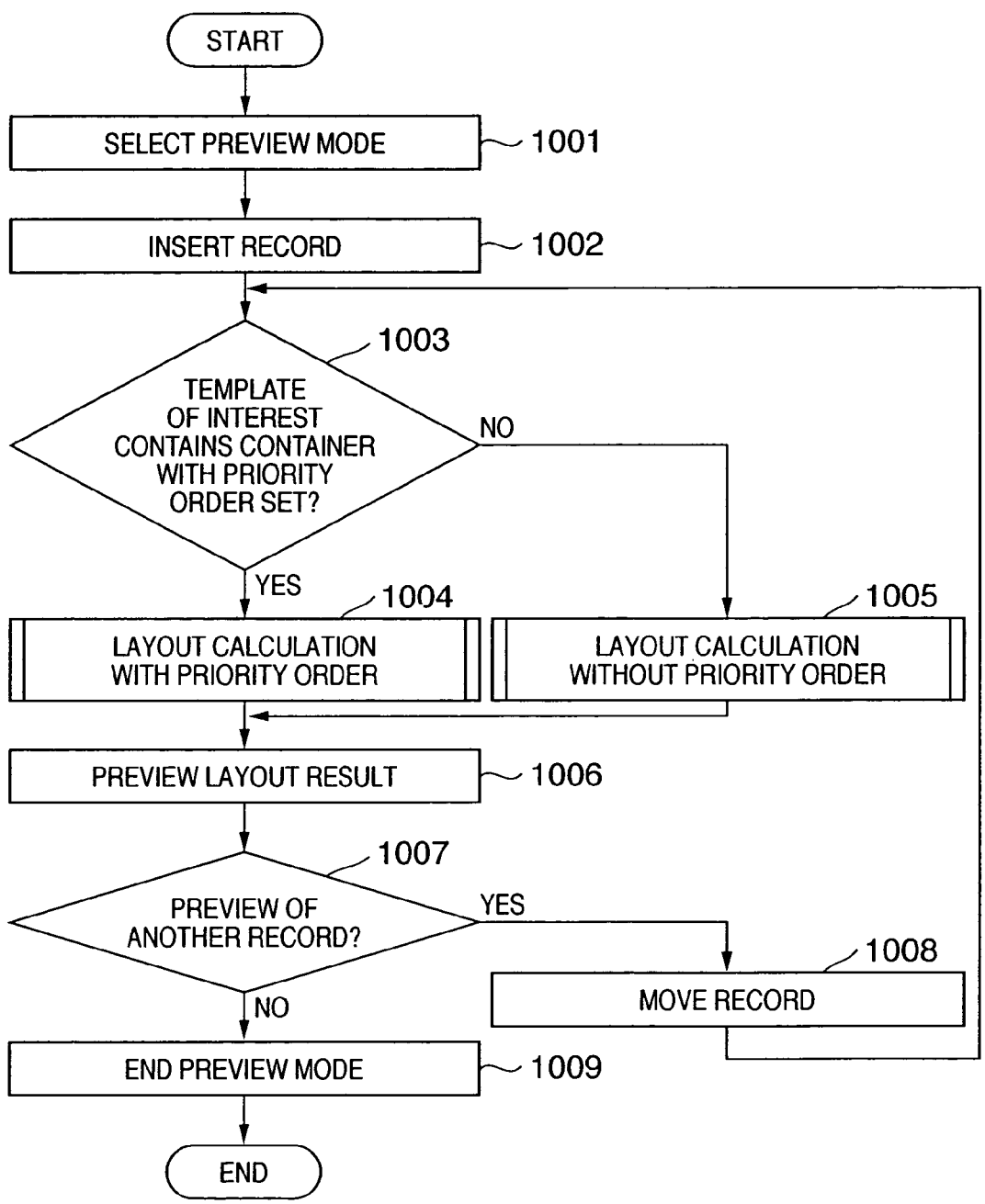
FIG. 10 is a flowchart showing the overall flow of layout calculation according to the present invention.

FIG. 10 shows the flow of the layout preview mode by using a template. This processing is also executed by the computer shown in FIGS. 1A to 2. First, a template of interest and its preview mode are selected in accordance with the operation of the operator (1001). Preview processing starts. The automatic layout system of this embodiment has two modes, i.e., a layout mode in which containers are created, and a layout is created by associating the containers with each other, and a preview mode in which records are inserted in the created layout, and the layout result after actual record insertion is previewed. FIG. 7 shows part of processing in the layout mode.

In the preview mode, the field of a corresponding record is inserted in each container in the template of interest. The size of each container is calculated in accordance with the priority order set for it. This is layout calculation. However, in the preview mode, layout calculation for display is done. Even in actual printing, layout calculation is done by inserting records. The calculation method at this time is the same as in the preview mode. When "preview" in FIG. 10 is changed to "print", the flow can also be used as processing procedures in the print mode.

In the preview mode, the layout editing application 121 selects a record to be previewed and inserts it in the template (1002). The record can appropriately be selected. The correspondence between a container and a field in the record is designated in the template data when it is created. The field to be inserted in each container is determined in accordance with the template data.

When the record is to be inserted, layout calculation is executed to lay out the record. The layout editing application 121 checks whether the containers contained in the template include a container having a priority order set (1003). To do this, the priority order information is scanned in all pieces of container information contained in the template data, and it is determined whether there is a container having a priority order. If it is determined by this check that a container having a set priority order is present, the layout is calculated under a condition "priority order is present" (1004). The layout calculation method under the condition "priority order is present" will be described later in detail with reference to FIG. 12. If it is determined in step 1003 that no container having a set priority order is present, the layout is calculated under a condition "priority order is absent" (1005). Step 1005 will be described later with reference to FIG. 11. The layout calculated in step 1004 or 1005 is displayed (1006). More specifically, corresponding contents are laid out in accordance with the finally determined containers, and a preview of the image is displayed.

It is determined whether to preview another record (1007). If NO in step 1007, the preview mode is ended (1009). If YES in step 1007, another record is selected, layout calculation is executed again, and preview is done (1008). Not in the preview mode but in the print mode, layout calculation is done sequentially for all records to be printed. Hence, the processing in steps 1007 and 1009 is not present. When printing is ended for all records, the processing is ended.

<Layout Calculation Method (Without Priority Order)>

Figure 11:
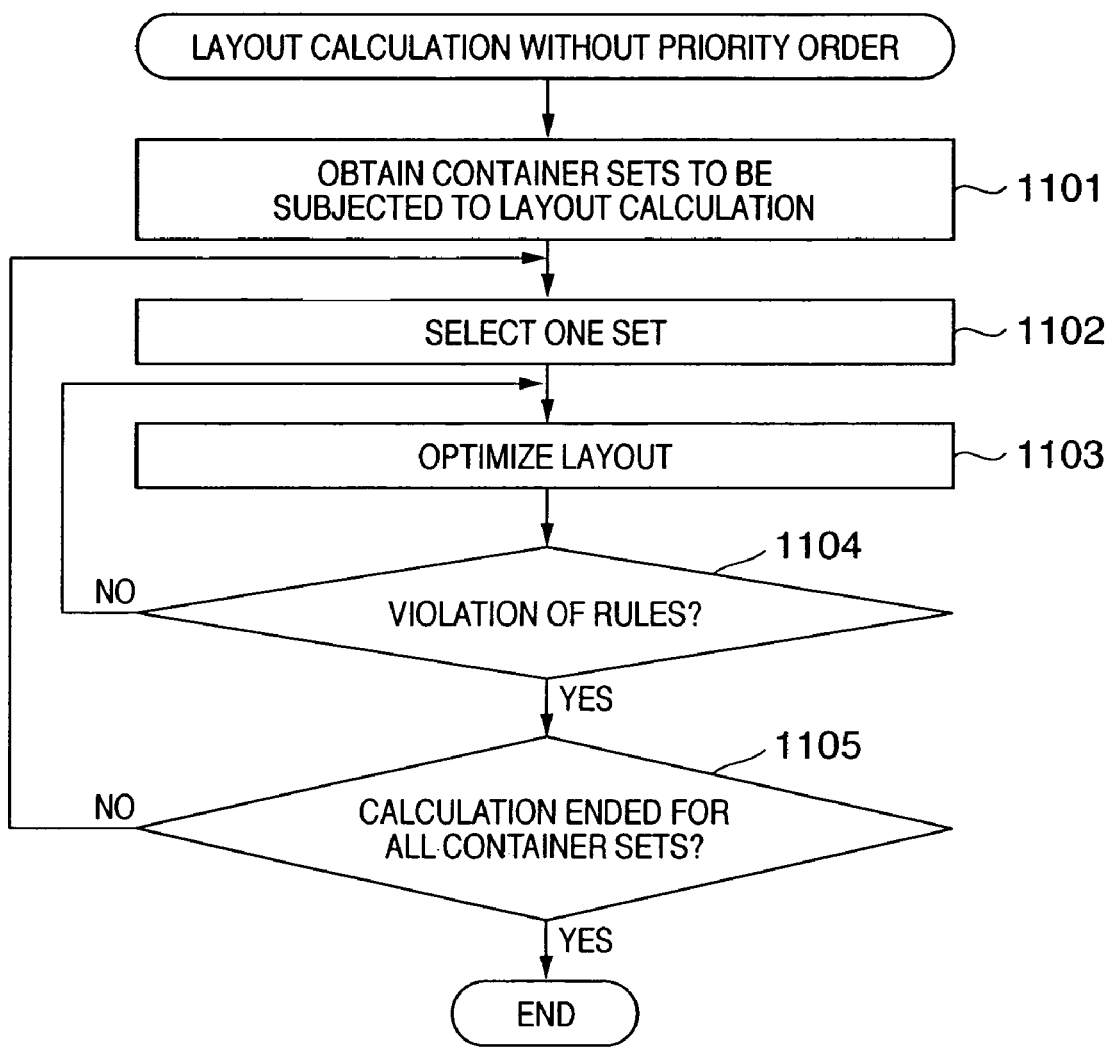
FIG. 11 is a flowchart showing a flow corresponding to step "layout calculation without priority order" in the flowchart in FIG. 10 of the present invention.

FIG. 11 is a flowchart showing the layout calculation method in step 1005 in FIG. 11 when no priority order is set. FIGS. 13A to 13C are views showing display examples of the UI at that time.

Figure 15:
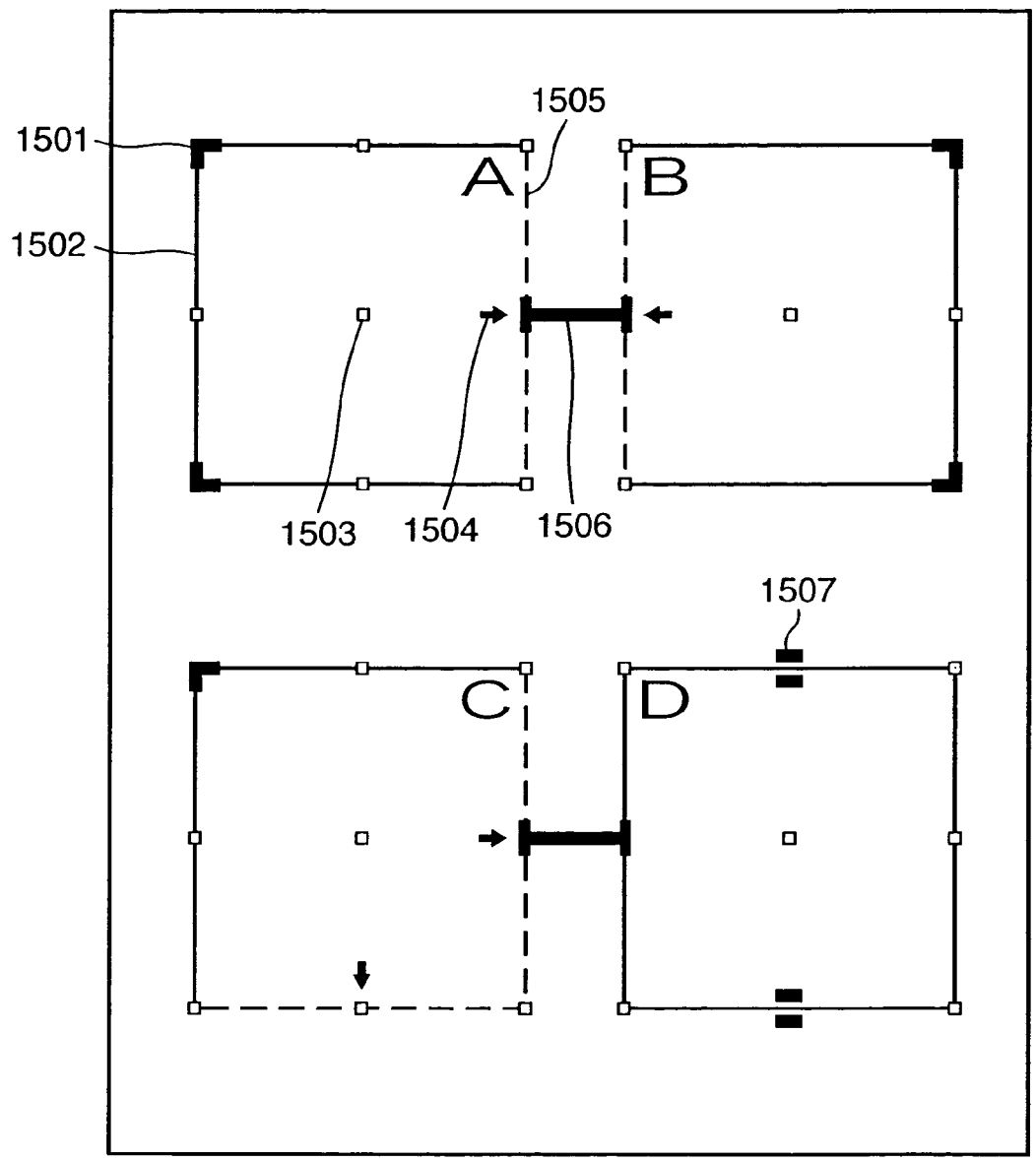
FIG. 15 is a view for explaining container sets in layout calculation according to the present invention.

First, container sets to be subjected to layout calculation are obtained (1101). Layout calculation is executed for each set of containers associated with a link. Referring to, e.g., FIG. 15, four containers are laid out on a page and associated with each other. In this case, containers A and B are associated by a link, and containers C and D are also associated by a link. Hence, the containers A and B form set 1, and containers C and D form set 2. As described above, reference numeral 1501 denotes an anchor; 1502, a fixed side; 1503, a controller; 1504, an arrow which indicates the change direction of a variable side; 1505, a variable side; 1506, a link; and 1507, a slider.

A set is selected from the container sets obtained in step 1101 to calculate the layout (1102). For the selected container set, layout calculation is executed. First, the sizes of the two containers (A and B) as variable elements included in the selected container set are calculated assuming that the containers are not affected by the image size or text size of data to be inserted. More specifically, the layout editing application 121 determines whether the container A is an image data container or text container. This determination can be done on the basis of the attribute set for the container, as described above. Next, the layout editing application 121 loads the data to be inserted in the container A. When the container A is an image data container, the size (the number of horizontal pixels, the number of vertical pixels, and the resolution) of the image data is defined as the size of the container A without any constraint. When the container A is a text container, the amount of data to be inserted in the container A can be calculated on the basis of the number of characters of text data and the character attribute such as a font type, font size, character pitch, and line pitch designated by the container attribute of the container A. For the text container, a constraint is applied because the aspect ratio of the container A cannot be determined without considering a constraint. In the example shown in FIG. 15, since anchors are set at the upper left and lower left corners of the container A, the height (vertical direction) is fixed. Hence, the layout editing application 121 determines whether characters corresponding to the calculated data size (text size) can be inserted in the container A having the width (horizontal direction) set as the basic pattern of the container A. If it is determined that all characters can be inserted, the size (width and height) set by the basic pattern does not change in the container A. If it is determined that not all characters can be inserted, the container A expands in the horizontal direction because the height is fixed by setting the anchors. In this case, the layout editing application 121 calculates the width of the container A, which allows insertion of characters in the calculated amount, thereby calculating the size of the container A.

Next, the layout editing application 121 optimizes the layout such that the difference between the size of each container to be laid out and the actual content size becomes as small as possible (1103). More specifically, the layout is optimized such that the difference between the size of the content to be inserted and the size of layout becomes as equal as possible between the containers associated with each other to dynamically change their sizes. The layout editing application 121 obtains the size of the container set selected in step 1102, i.e., the total size of the container A, container B, and link 1506 (fixed link). Then, the layout editing application 121 calculates the difference between the total size and the size of the container set in the basic layout (in the example shown in FIG. 15, the size of the container set corresponds to the distance between the anchor icons of the containers A and B). If the width of the container A or B is increased as the result of calculation in the preceding step, a different value is generated. The layout editing application 121 equally distributes the difference value to the elements of the container set, thereby adjusting the layout.

The layout editing application 121 optimizes the layout. If a violation of rules has occurred, calculation is done again to prevent any violation of rules (1104). The rules described here are constraints set by the user in creating the layout. Examples of the constraints are the size and position of a container and the length of a variable link. To determine whether a violation of rules has occurred, the position and size of each container after layout calculation are checked by referring to the container information 1903 and link information 1904 of the template data. More specifically, the positions of the fixed sides, corner points, axes, and central points, and the size of fixed sides are compared to determine whether a side to be fixed has moved, or movement more than the constraint has been done. When the layout is calculated without any violation of rules, i.e., when the size and position of each container in the container set of interest are determined, the layout of that set is completed. The processing in steps 1102 to 1104 is executed for all container sets on the page. The layout of the entire page is thus calculated (1105).

However, optimization is necessary only when a content cannot be fitted in a container initially defined on the template. If a corresponding content can be fitted in an associated container without changing its size, the optimization procedures need not be executed. In this case, layout processing is performed to fill each container with a corresponding content, and the container size is not changed.

FIGS. 13A to 13C show examples of the UI in the preview mode in which layout is done without setting any priority order. FIG. 13A shows a state in which records are inserted, and the layout is determined. Reference numerals 1301 and 1302 denote anchors; 1303 and 1304, fixed sides; 1305, a variable side; 1306, an arrow which indicates the change direction of a variable side; and 1308, a link. In this state, the records are changed, and contents having different sizes are inserted. FIG. 13B shows the new container sizes after layout calculation, which are superposed on the state shown in FIG. 13A. Alternate long and two short dashed lines 1309 indicate the sizes of contents to be inserted in the respective containers. Layout calculation is executed. FIG. 13C shows the result of layout calculation. The sizes of containers after layout calculation are calculated such that they have the same difference to the size of the content to be actually inserted, and no violation of the above-described rules occurs. As shown in FIG. 13C, content sizes (1309) to be inserted shown in FIG. 13B and the content sizes (1310) after calculation have the same difference. To do this, the position of each movable side corresponding to the content size is obtained. This can be obtained from the relationship between the container size and the fixed side of the container to receive it. That is, the position to which each movable side should be moved is determined such that the container can have a size to receive the whole content. If there are two movable sides, they are moved by, e.g., the same distance. This processing is executed for each container in the container set of interest. The position to which each variable side should be moved again is determined such that the distance between the containers equals the distance defined by the link. At this time, the movable side is moved again without moving the intermediate point between the movable sides of the two containers. In this way, layout calculation is executed.

<Layout Calculation Method (With Priority Order)>

Figure 12:
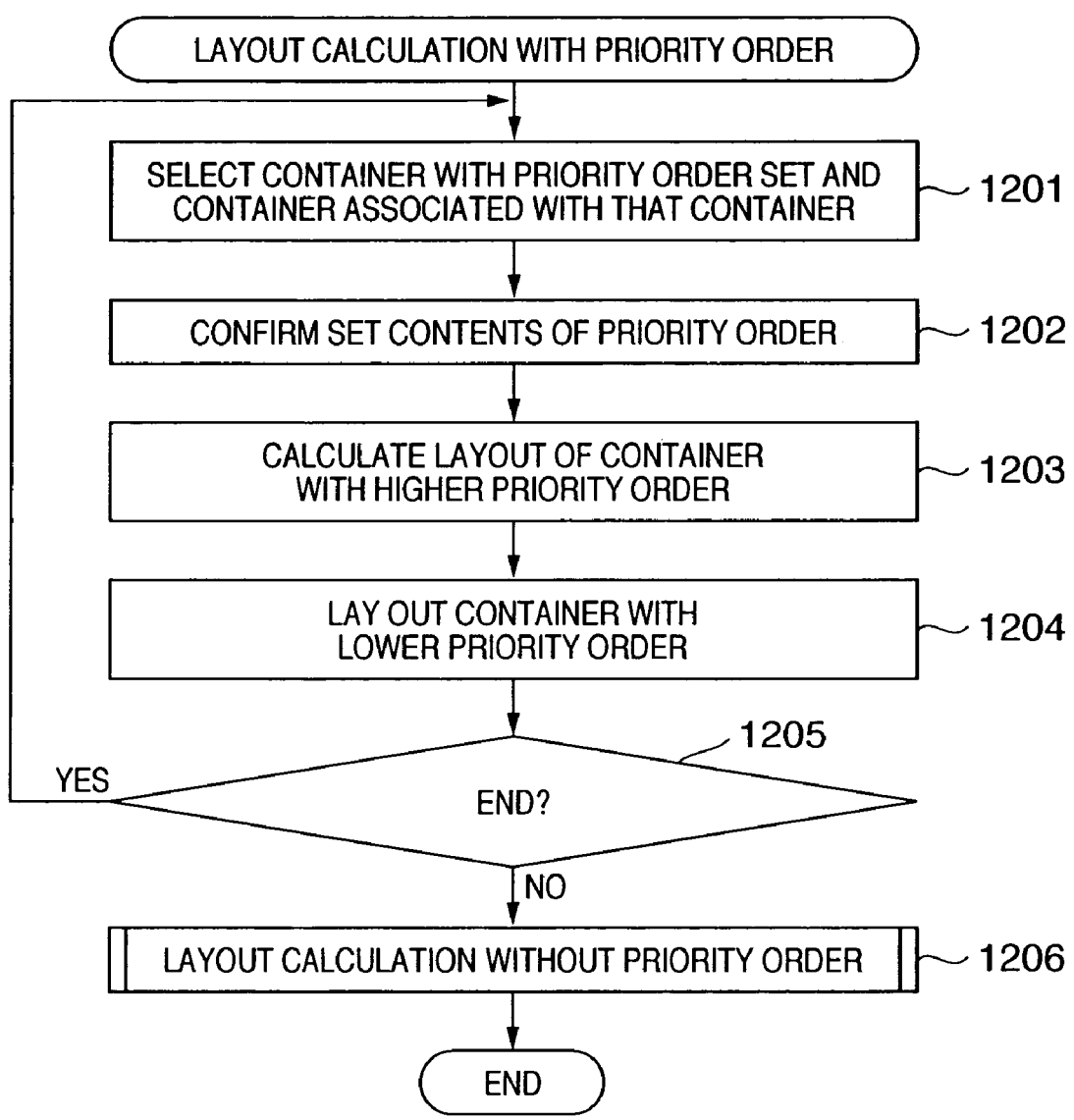
FIG. 12 is a flowchart showing a flow corresponding to step "layout calculation with priority order" in the flowchart in FIG. 10 of the present invention.
Figure 14A:
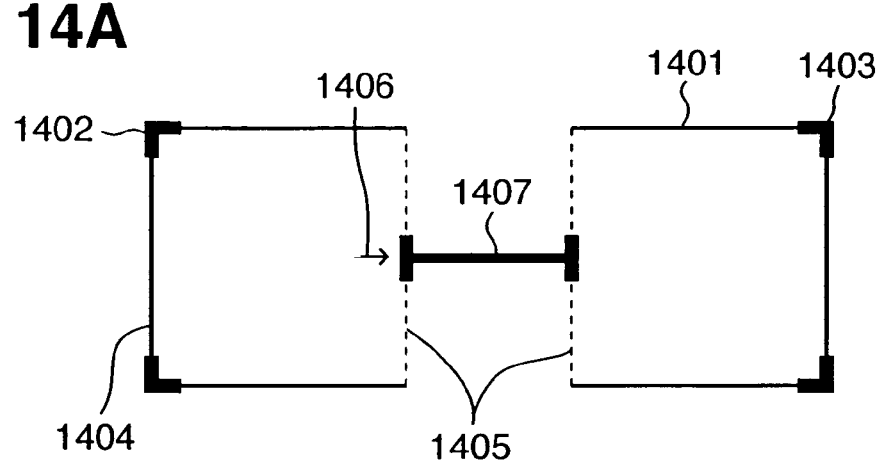
FIGS. 14A to 14C are views showing examples of a UI corresponding to the flow in FIG. 12 of the present invention.
Figure 14B:
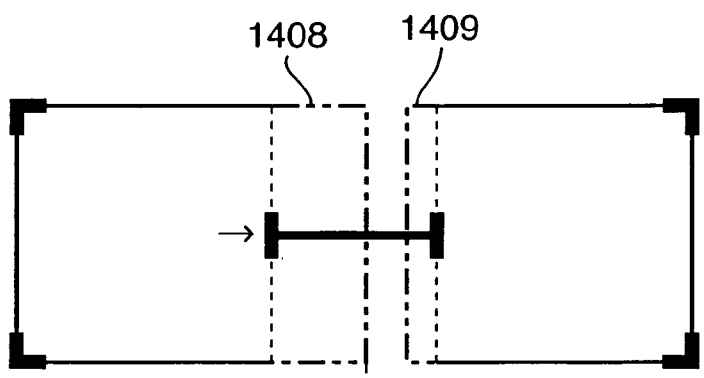
Figure 14C:
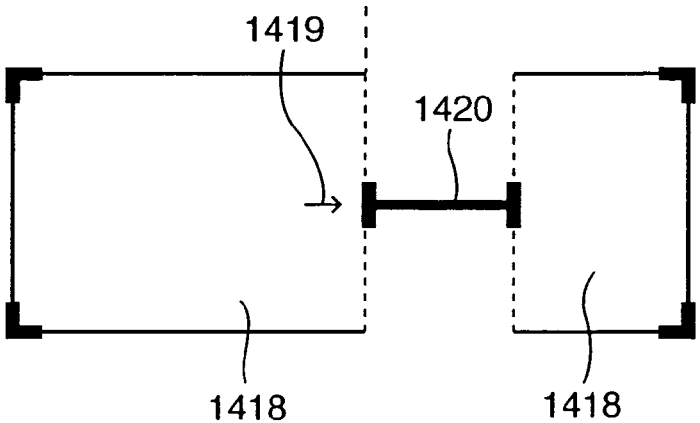

FIG. 12 is a flowchart showing the layout calculation method in step 1004 in FIG. 10 when the priority order is set. FIGS. 14A to 14C are views showing display examples of the UI in the preview mode at that time. A description will be done with reference to FIGS. 12 and 14A to 14C. Referring to FIG. 14A, reference numerals 1401 and 1404, fixed sides; 1402 and 1403, anchors; 1405, a variable side; 1406, an arrow which indicates a change direction of the variable side; 1407, a link.

The layout editing application 121 selects, from a template of interest, a container having a priority order and another container associated with that container by a link (1201). To select containers, an identifier representing a container which satisfies the condition is stored in a lookup memory area. The two containers shown in FIG. 14A correspond to the selected containers. The right container is a container having a set priority order. The left container is a container which is associated with the right container and has no set priority order. The layout editing application 121 confirms the contents of the set priority order (1202). More specifically, the layout editing application 121 determines by referring to the template data whether one of the above-described flags "container width is not affected by content size" and "container height is not affected by content size" or both of them are set. The priority of a container having a priority order is lower than that of a container associated with that container. In the example shown in FIG. 14A, "container width is not affected by content size" is set for the right container. The priority of layout calculation is lower than the left container. Hence, the size of the right container is affected only by a change in size of the left container.

The layout editing application 121 preferentially calculates the layout of the container having with higher priority order (1203). More specifically, the position of a variable side of the container which is changed by the size of the content to be inserted in the container having the higher priority order is calculated. If a plurality of variable sides are present, their positions are calculated such that they are moved in by the same amount. After that, the layout editing application 121 calculates the layout of the container having the lower priority order (1204). More specifically, the position of a variable side of the container having the lower priority order is calculated such that the distance from the container having the higher priority order is maintained at the distance defined by the link.

Assume that contents having sizes indicated by alternate long and two short dashed lines 1408 and 1409 in FIG. 14B are inserted in the container layout shown in FIG. 14A. In this example, the priority order of the left container is set higher. Hence, the layout of the left container is calculated first. Since the content 1408 is inserted in the left container, the right side of the container, which is a variable side, moves to the right. Since there is no influence of the right container, the left container can be enlarged as much as possible without any violation of rules. Hence, for the left container, the content to be inserted can be laid out in an ideal side as much as possible. In the example shown in FIGS. 14A to 14C, the left container can be enlarged to the same size as that of the content to be inserted.

It is determined whether processing for the container having a priority order is ended, i.e., whether an unprocessed container having a priority order included in the template of interest remains. If an unprocessed container remains, the processing from step 1201 is repeated (1205).

Next, the layout editing application 121 executes layout calculation for the right container having a lower priority order. The size of the left container and the length of the link are already determined. For this reason, the size of the right container to be laid out without any violation of rules is also determined. More specifically, the left side of the right container is moved to a position separated from the right side of the left container by the distance of the link 1407. Finally, calculation is executed for a container having no priority order included in the template of interest in accordance with the same procedures as in <Layout Calculation Method (Without Priority Order)> described above (1205).

In some cases, the contents of a container and, more particularly, the contents of a container having a lower priority order cannot completely be displayed in the display (print) mode. In this case, reduction (or enlargement) or clipping of the content can be designated. This designation can be done for each container in accordance with the procedures as shown in FIG. 7, like priority order setting. In the processing for laying out the content in the preview or print mode, enlargement, reduction, or clipping is executed for the content in accordance with the designation. In addition, optimization is necessary only when a content cannot be fitted in a container initially defined on the template. If a corresponding content can be fitted in a container with a higher priority order without changing its size, the optimization procedures need not be executed. In this case, layout processing is performed to fill each container with a corresponding content, and the container size is not changed.

As described above, the priority order information of this embodiment has the first value (priority flag ON) and the second value (priority flag OFF) indicating a higher priority order than the first value. When the priority order value is the second value, the layout means changes the size of a region (container) in accordance with the size of data to be laid out. When the priority order value is the first value, the layout means changes the size of the region in accordance with the size of another region.

The template further contains link information representing the distance between at least the two regions. The layout means lays out data in each container in accordance with the order represented by the priority order while maintaining the distance between the regions (containers) indicated by the link information.

This embodiment further comprises a generation means for generating a template containing region information (container information) to lay out data and priority order information representing a priority order associated with the region.

The embodiment further comprises a display means for displaying a preview of a document in which the data is laid out by the layout means. The display means distinguishably displays the priority order associated with the region (container) by the presence/absence of an arrow (enlarge/reduce icon).

As described above, according to this embodiment, a priority order in automatic layout can be set for each container. For this reason, the degree of freedom of layout can be increased, and the size of a container which should have a greater appeal than remaining containers can be increased with priority over the remaining containers. In addition, since the set priority order can visually be displayed on the user interface the user can readily predict the layout result after automatic layout.

Second Embodiment

As the second embodiment of the present invention, a method of setting a priority order in FIGS. 7 and 8 without using any pop-up menu or dialogue described in the first embodiment will be described. In this embodiment, a priority order is set in accordance with the order of container selection in link setting.

<Priority Order Setting Method (2)>

Figure 17:
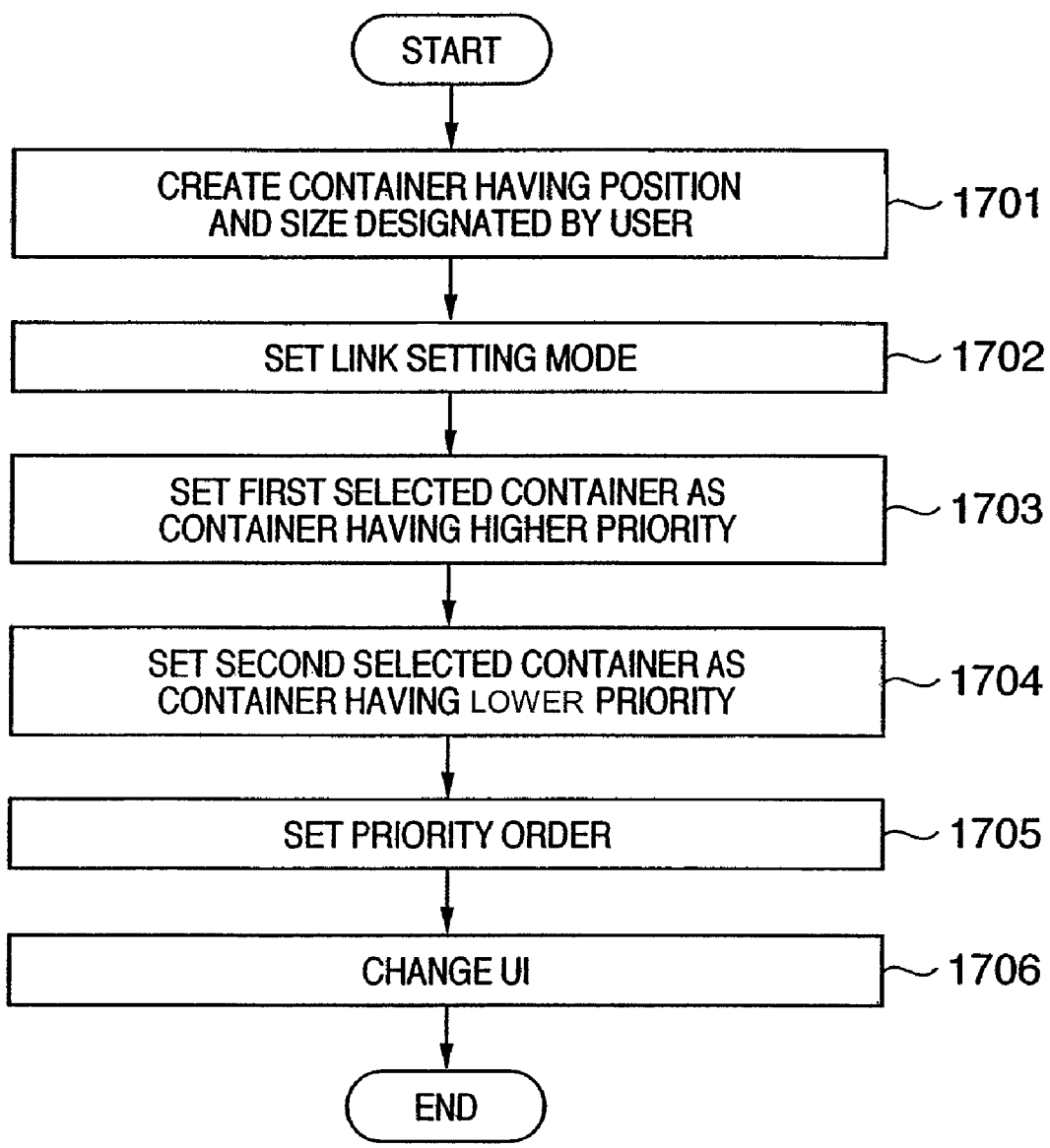
FIG. 17 is a flowchart of the flow of priority order setting according to the second embodiment.
Figure 18A:
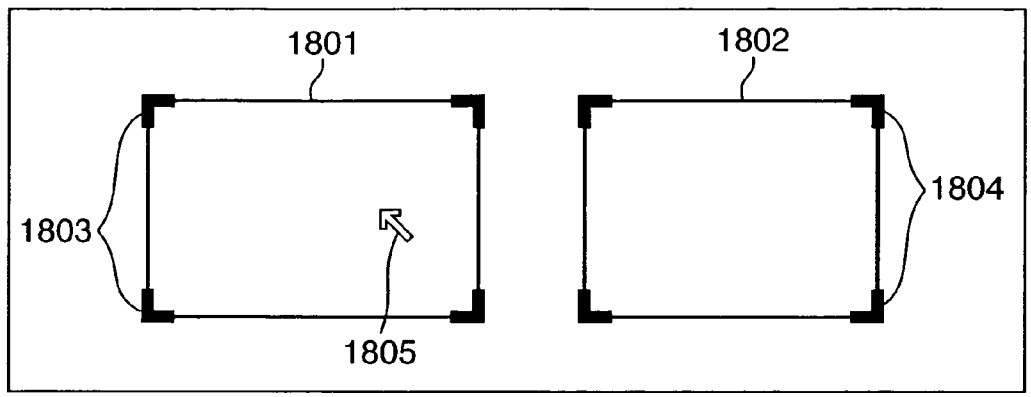
FIGS. 18A to 18C are views showing examples of a UI in priority order setting according to the second embodiment.
Figure 18B:
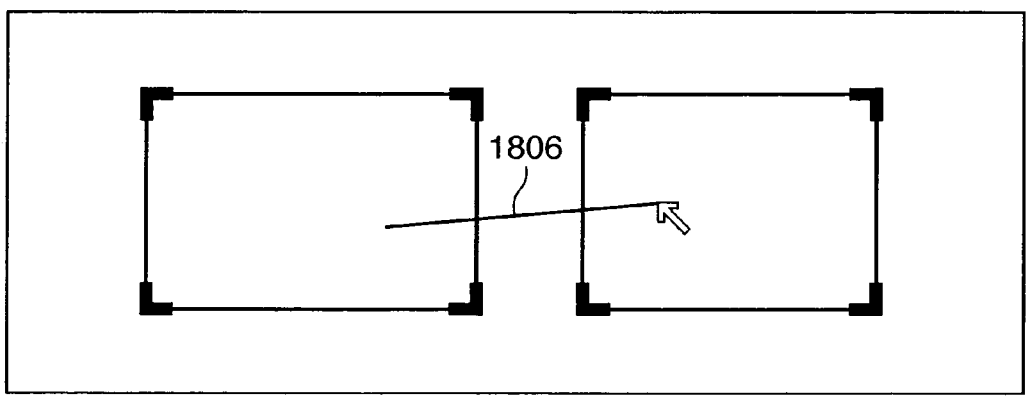
Figure 18C:
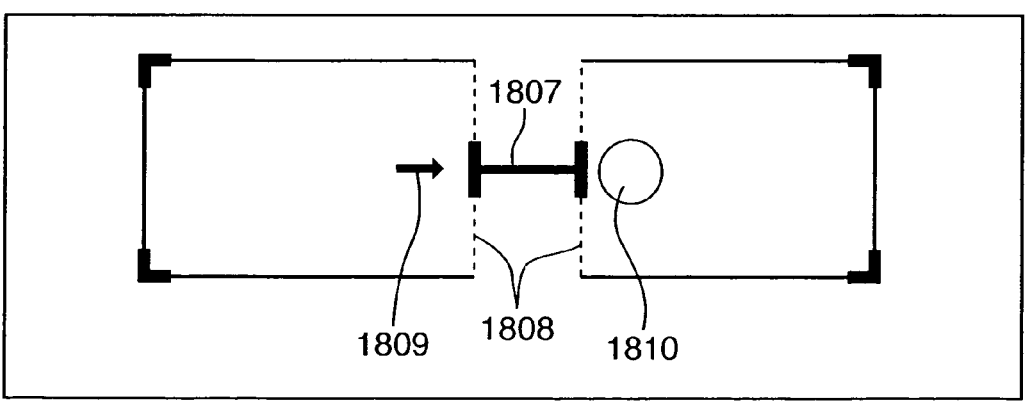

FIG. 17 shows the flow of procedures for automatically setting a priority order by creating a link. FIG. 17 shows an operation in a template mode. FIGS. 18A to 18C show examples of the UI in executing the processing.

First, a layout editing application 121 creates containers in accordance with the operation of the operator (1701). The position and size of each created container, the attribute of each side, and corresponding content information are stored in container information 1903 of template data. In this embodiment, since a priority order is set by using a link, at least two containers to be associated by a link must be created.

When the link tool is selected, a link creation mode is set (1702). A link is created for the containers as priority order setting targets in accordance with the operation of the operator. The layout editing application 121 sets a higher priority order for the container selected first from the containers as the link setting targets (1703). When a link is created from the selected container to the container to be associated by dragging the mouse, a lower priority order is set for the container selected as the link destination by the mouse (1704). The priority orders are stored in priority order information 19031 (1705). More specifically, the priority order information can be a numeral value corresponding to the selected order. To use the "priority flag" of the first embodiment, the priority flag of the container having the lower priority order, i.e., the container selected by the mouse drag operation as the link destination is set. At this time, of the priority flags provided for the height and widthwise directions, the priority flag in the link destination is set. That is, when the link is set in the horizontal direction, the priority flag "container width is not affected by content size" is set. When the link is set in the vertical direction, the priority flag "container height is not affected by content size" is set.

An example of the window displayed as the user interface of the template mode in executing the processing shown in FIG. 17 will be described with reference to FIGS. 18A to 18C. FIG. 18A shows a state in which containers are created. Reference numerals 1801 and 1802 denote fixed sides; 1803 and 1804, anchors; and 1805, a pointer. In this example, the priority order of the left container is set higher. The operator selects the left container first and sets a link to the right container, as shown in FIG. 18B. At this time, to visually present the priority order relationship "left container>right container" to the user, the UI display may be changed to an arrow, as indicated by an arrow 1806. When the link is set, the container setting is changed to that shown in FIG. 18C. As described in <Link Setting Method> in the first embodiment, since the link is set from the left container to the right container, a link UI 1807 is displayed. In addition, the fixed sides are changed to variable sides 1808. Furthermore, since the priority order of the left container is higher, the change direction is indicated by an enlarge/reduce icon (arrow) 1809 for the container on the left side. However, no enlarge/reduce icon is displayed at a position 1810. This expresses that the priority order "container width is not affected by content size" described in the first embodiment is set for the right container simultaneously as the link is set. Referring to FIGS. 18A to 18C, since the link is set in the horizontal direction, the priority order for the width is set. When the link is set in the vertical direction, the priority order is set for the height as a matter of course.

The system may use both the priority order giving methods of the first and second embodiments. In this case, the priority order is given in accordance with link setting, as in the second embodiment, and the priority order can be changed as the attribute of a container, as in the first embodiment. Accordingly, the priority order set simultaneously with link setting can be canceled.

In procedures for displaying a preview mode or printing the document by using the template in which a priority order is given to a container, the same layout calculation processing as in the first embodiment is executed.

As described above, in the second embodiment, the priority order is given to each selected region in accordance with the order of region selection (the order of the link source and link destination) in the operation (operation shown in FIGS. 17 and 18A to 18C) of associating the regions (containers) to lay out data.

As described above, according to this embodiment, the priority order of each container can be set in accordance with the order of container selection in link setting. For this reason, the priority order setting operation is simplified.

Figure 20:
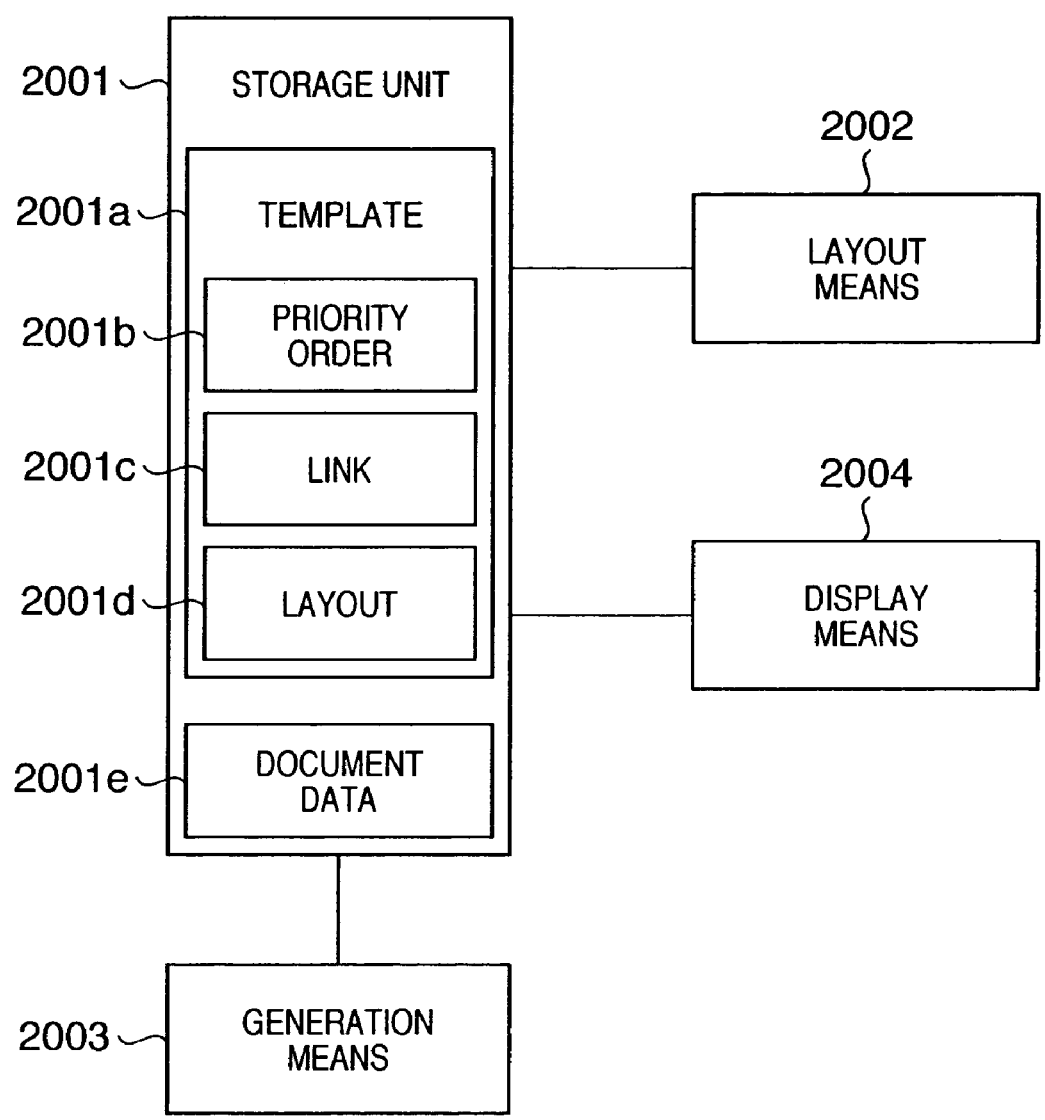
FIG. 20 is a view showing an example of a block diagram of the document processing apparatus according to the present invention.

FIG. 20 is a functional block diagram showing principal constituent elements of a document processing apparatus according to the present invention. The document processing apparatus comprises a storage means 2001 and a layout means 2002. The storage means 2001 stores a template 2001a which contains a plurality of combinations of region information 2001d representing a region to lay out data and priority order information 2001b representing a priority order associated with that region.

The layout means 2002 lays out data corresponding to the region in an order represented by the priority order 2001b in accordance with the template 2001a and changes the size or position of the region in accordance with the data without invading a region associated with a higher priority order than the region.

The template 2001a stored in the storage means 2001 further contains the priority order information 2001b independently for each region information 2001d.

The priority order information 2001b has a first value and a second value indicating a higher priority order than the first value. When the value of the priority order information 2001b is the second value, the layout means 2002 changes the size of the region in accordance with the size of data to be laid out. When the value of the priority order information 2001b is the first value, the layout means 2002 changes the size of the region in accordance with the size of another region.

The template 2001a further contains link information 2001c which indicates at least the distance between the two regions. The layout means lays out data in the region in accordance with the order represented by the priority order 2001b while maintaining the distance between the regions indicated by the link information 2001c.

The apparatus further comprises a generation means 2003 for generating the template 2001a containing the region information 2001d to lay out data and the priority order information 2001b representing a priority order associated with the region.

The apparatus further comprises a display means 2004 for displaying a preview of a document 2001e in which the data is laid out by the layout means 2002. The display means 2004 distinguishably displays the priority order associated with the region.

The generation means 2003 gives a priority order to each selected region in accordance with the order of region selection in the operation of associating the regions to lay out data.

The template 2001a stored in the storage means 2001 contains the region information 2001d having the priority order information 2001b set and the region information 2001d having no priority order information 2001b set.

When the priority order information 2001b is set in the region information 2001d, the layout means 2002 lays out corresponding data in the region in the order represented by the priority order information 2001b. When no priority order information 2001b is set in the region information 2001d, the layout means 2002 determines the layout by laying out data in the region dynamically in accordance with the data size.

Modification to Embodiments

Processing for changing the size of a container having a priority order has been described in the first and second embodiments. In the first embodiment, the priority order is implemented by the order of adjustment in adjusting the container size independently for each container.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website-via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-024584 filed on Jan. 30, 2004, which is hereby incorporated by reference herein.

What is claimed is:

1. A document processing apparatus for deciding a layout by using data to be output and a template containing regions to which the data is assigned, the document processing apparatus having a CPU and a memory unit, comprising:
a selecting unit constructed to select a first region, and subsequently to select a second region after the selection of the first region;
a first setting unit constructed to set a link between the first region and the second region to connect the first region and the second region;
a second setting unit constructed to set a first value indicating a higher priority order than a second value for the first region selected first by said selection unit and to set the second value indicating a lower priority order than the first value for the second region selected after the selection of the first region by said selection unit according to the order of selection of regions selected by said selection unit; and
a user interface unit constructed to display a user interface indicating that the first region can invade the second region and the second region can not invade the first region when the first value is set for the first region and the second value is set for the second region;
a layout unit constructed to decide a size of the first region to which the first value is set by using a size of the data assigned to the first region and to decide a size of the second region for which the second value is set such that the second region does not invade the first region of which the size was decided when the second setting unit sets the first and second values for the first region and the second region connected by the link, and to decide the size of the first region and the second region connected by the link such that respective change amounts of the data assigned to the first region and the second region are the same when the second setting unit does not set both the first and second values for the first region and the second region.

2. An apparatus according to claim 1, wherein the template contains a link representing a distance between two regions, and said layout unit decides the sizes of regions keeping the distance represented by the link unchanged.

3. An apparatus according to claim 1, further comprising a display unit constructed to display a document of which data is assigned to the regions whose sizes have been decided by said layout unit, wherein said display unit further displays information regarding the priority orders set to the regions.

4. An apparatus according to claim 1, further comprising a change unit constructed to, in a case where attribute values of edges of first and second regions which are connected to each other by the link set by said first setting unit are fixed such that the edges are fixed, change the attribute values of the edges of the first and second regions into variable such that the edges are movable,
wherein said user interface unit displays a user interface which indicates the edges if the first and second regions connected to each other by the link are variable.

5. A document processing method for deciding a layout by using data to be output and a template containing regions to which the data is assigned, comprising:

a selecting step of selecting a first region, and subsequently to select a second region after the selection of the first region;

a first setting step of setting a link between the first region and the second region to connect the first region and the second region;

a second setting step of setting a first value indicating a higher priority order than a second value for the first region selected first in said selecting step and setting the second value indicating a lower priority order than the first value for the second region selected after the selection of the first region in said second selecting step according to the order of selection of regions selected in said selecting step; and a user interface display step of displaying a user interface indicating that the first region can invade the second region and the second region can not invade the first region when the first value is set for the first region and the second value is set for the second region;

a layout step of deciding a size of the first region to which the first-value is set by using a size of the data assigned to the first region and deciding a size of the second region for which the second value is set such that the second region does not invade the first region of which the size was decided when the second setting step sets the first and second values for the first region and the second region connected by the link, and deciding the size of the first region and the second region connected by the link such that respective change amounts of the data assigned to the first region and the second region are the same when the second setting step does not set both the first and second values for the first region and the second region.

6. A method according to claim 5, wherein the template contains a link representing a distance between two regions, and in said layout steps the sizes of regions are decided keeping the distance represented by the link unchanged.

7. A method according to claim 5, further comprising a display step of displaying a document of which data is assigned to the regions whose sizes have been decided in said layout step, wherein said document display step further displays information regarding the priority orders set to the regions.

8. A method according to claim 5, further comprising a change step of, in a case where attribute values of edges of first and second regions which are connected to each other by the link set by said first setting unit are fixed such that the edges are fixed, changing the attribute values of the edges of the first and second regions into variable such that the edges are movable, wherein said user interface display step displays a user interface which indicates the edges if the first and second regions connected to each other by the link are variable.

9. A computer-readable medium storing a computer program for deciding a layout by using data to be output and a template containing regions to which the data is assigned, the program comprising:

code for a selecting step of selecting a first region, and subsequently to select a second region after the selection of the first region;

code for a first setting step of setting a link between the first region and the second region to connect the first region and the second region;

code for a second setting step of setting a first value indicating a higher priority order than a second value for the first region selected first in said selecting step and setting the second value indicating a lower priority order than the first value for the second region selected after the selection of the first region in said selecting step according to the order of selection of regions selected in said selecting step; and code for a user interface display step of displaying a user interface indicating that the first region can invade the second region and the second region can not invade the first region when the first value is set for the first region and the second value is set for the second region;

code for a layout step of deciding a size of the first region to which the first value is set by using a size of the data assigned to the first region and deciding a size of the second region for which the second value is set such that the second region does not invade the first region of which the size was decided when the second setting step sets the first and second values for the first and second regions connected by the link, and deciding the size of the first region and the second region connected by the link such that respective change amounts of the data assigned to the first and the second regions are the same when the second setting step does not set both the first and second values for the first and the second regions.

10. A program according to claim 9, wherein the template contains a link representing a distance between two regions, and in said layout steps, the sizes of regions are decided keeping the distance represented by the link unchanged.

11. A program to claim 9, further comprising code for a display step of displaying a document of which data is assigned to the regions whose sizes have been decided in said layout step, wherein said document display step further displays information regarding the priority orders set to the regions.

12. A medium according to claim 9, further comprising code for a change step of, in a case where attribute values of edges of first and second regions which are connected to each other by the link set by said first setting unit are fixed such that the edges are fixed, changing the attribute values of the edges of the first and second regions into variable such that the edges are movable, wherein said user interface display step displays a user interface which indicates the edges if the first and second regions connected to each other by the link are variable.

* * * * *